US012631239B2

(12) United States Patent
Lipscomb

(10) Patent No.: US 12,631,239 B2
(45) Date of Patent: May 19, 2026

(54) CABLE TENSIONING ASSEMBLY AND METHOD OF USING SAME

(71) Applicant: Western Green, LLC, Evansville, IN (US)

(72) Inventor: Chad Lipscomb, Evansville, IN (US)

(73) Assignee: Western Excelsior, LLC, Evansville, IN (US)

( * ) Notice: Subject to any disclaimer, the term of this patent is extended or adjusted under 35 U.S.C. 154(b) by 0 days.

(21) Appl. No.: 18/576,011

(22) PCT Filed: Sep. 21, 2022

(86) PCT No.: PCT/US2022/044251
§ 371 (c)(1),
(2) Date: Jan. 2, 2024

(87) PCT Pub. No.: WO2023/049179
PCT Pub. Date: Mar. 30, 2023

(65) Prior Publication Data
US 2024/0309937 A1      Sep. 19, 2024

Related U.S. Application Data

(60) Provisional application No. 63/246,561, filed on Sep. 21, 2021.

(51) Int. Cl.
*F16G 11/04*        (2006.01)
*F16G 11/10*        (2006.01)
(52) U.S. Cl.
CPC .................................. *F16G 11/048* (2013.01)

(58) Field of Classification Search
CPC ....... F16G 11/048; F16G 11/101; F16G 11/14
See application file for complete search history.

(56) References Cited

U.S. PATENT DOCUMENTS

| | | | | |
|---|---|---|---|---|
| 1,692,993 | A | * | 11/1928 | Lambert ............... F16G 11/105 |
| | | | | 403/374.2 |
| 4,049,357 | A | * | 9/1977 | Hamisch, Jr. ......... F16G 11/048 |
| | | | | 220/4.24 |
| 5,070,805 | A | * | 12/1991 | Plante ................... F16G 11/101 |
| | | | | 24/134 P |
| 5,208,950 | A | * | 5/1993 | Merritt ................... F16G 11/14 |
| | | | | 24/132 WL |
| 5,511,290 | A | * | 4/1996 | Perry ...................... A43C 7/00 |
| | | | | 24/712.1 |

(Continued)

OTHER PUBLICATIONS

International Search Report and Written Opinion issued in counterpart PCT Application No. PCT/US2022/044251 dated Feb. 7, 2023 (eleven (11) pages).

*Primary Examiner* — Bayan Salone
(74) *Attorney, Agent, or Firm* — E. Eirc Mills; Todd A. Serbin; Maynard Nexsen PC

(57) ABSTRACT

A cable tensioning assembly for securing at least one elongate member, comprising: a case having a first side and an opposing second side with a first and a second curved cavity, respectively: a first and second gripping arrangement in the first and the second curved cavity, respectively, each of the gripping arrangements having a clamp; a central cavity with a connector disposed within said central cavity, wherein each of the gripping arrangement clamps are adapted to secure the at least one elongate member against the case by activating the connector.

15 Claims, 29 Drawing Sheets

(56) References Cited

U.S. PATENT DOCUMENTS

| | | | | |
|---|---|---|---|---|
| 6,058,574 | A * | 5/2000 | Facey | F16G 11/106 |
| | | | | 24/115 R |
| 6,618,910 | B1 * | 9/2003 | Pontaoe | F16G 11/048 |
| | | | | 24/115 R |
| 10,212,973 | B2 * | 2/2019 | Betts | A45C 13/10 |
| 10,398,197 | B2 * | 9/2019 | Shimizu | F16G 11/106 |
| 2014/0123439 | A1 | 5/2014 | Bacon | |
| 2018/0153262 | A1 * | 6/2018 | Shimizu | F16G 11/101 |

* cited by examiner

CABLE TENSIONING ASSEMBLY AND METHOD OF USING SAME

CROSS REFERENCE TO RELATED APPLICATIONS

This application is a 35 U.S.C. § 371 U.S. national phase entry of International Patent Application No. PCT/US2022/044251 having an international filing date of Sep. 21. 2022, which claims the benefit of priority under PCT Article 8 and PCT Rule 4.10 of U.S. Provisional Patent Application No. 63/246,561 filed Sep. 21, 2021, the contents of which are incorporated herein by reference in their entirety.

TECHNICAL FIELD

The presently disclosed subject matter relates generally to cable tensioning arrangements, assemblies and devices, and more particularly to an assembly for locking or gripping elongate members and method of using same.

BACKGROUND

Cables, wires, tendons, ropes, and the like, referred to collectively herein as elongate members, are readily used for load bearing and tensioning in construction and other applications. To allow load to be applied, the elongate members are secured in place through various gripping and locking devices. Commonly these devices include a primary clamping means that secures the elongate member a single direction. In the event of vibration, such as caused by weather events, the cable may become lose and fail to maintain the appropriate tension.

Accordingly, a need remains to provide a device for securely holding elongate members.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention; its sole purpose is to present concepts of the invention in a simplified form as a prelude to the more detailed description that is subsequently presented Aspects of a cable tensioning assembly and method for using same are briefly disclosed. In one aspect, a cable tensioning assembly is provided that may hold two elongate members, or one elongate member looped back through, firm in place, allowing load to be applied.

In another aspect, a cable tensioning assembly for securing at least one elongate member is provided, comprising: a case having a first side and an opposing second side with a first and a second curved cavity, respectively; a first and second gripping arrangement in the first and the second curved cavity, respectively, each of the gripping arrangements having a clamp; and, a central cavity with a connector disposed within said central cavity, wherein each of the gripping arrangement clamps are adapted to secure the at least one elongate member against the case by activating the connector.

In another aspect, a cable tensioning assembly for holding elongate members is provided that may have a cable tensioning housing with two symmetrical sides, each side may have a one-way cable pull function, providing load resistance.

In still another aspect, a cable tensioning assembly for holding elongate members in place in a housing is provided that may have a vibration arrest arrangement. In one embodiment, a vibration arrest arrangement may include a primary and a secondary clamp. When such vibration arrest arrangement is engaged, a secondary clamp may be pulled into place such that an elongate member is locked to the housing of the cable tensioning assembly.

In another aspect, a cable tensioning assembly having a vibration arrest feature is provided that may provide additional resistance such that elongate members held by the cable tensioning assembly have no motion in either direction and/or the cable tensioning assembly becomes a zero-way cable pull that will vibrate in harmony with the elongate member. In still another aspect, a cable tensioning assembly is provided that holds an elongate member in place such that when external stresses, including weather events, that cause movement or vibration, act on the elongate member, the cable tensioning assembly will move in sync with the elongate member.

In yet another aspect, a cable tensioning assembly having a gripping feature is provided that may prevent elongate members from becoming loose, that may add slack to the elongate members, or that may tighten the elongate member with a ratchet effect.

In still another aspect, a cable tensioning assembly having a dynamic clamp feature with a primary and secondary clamp mechanism is provided that may prevent elongate members from becoming loose, that may add slack to the elongate members, or that may tighten the elongate member with a ratchet effect.

Another aspect may be a cable tensioning assembly that may have an axial design allowing for a part of the assembly to be made by a casting process without orthogonal axis relief (i.e., molds that can be opened in two directions).

In still another aspect, a cable tensioning assembly having an integrated spring/vibration clamp arrangement may be provided for both holding a clamping member and spring in place, and for clamping an elongate member to the cable tensioning housing or case. In prior arrangements, one part of such assemblies served to hold a spring or urging member, whereas a different part served to provide the clamping force.

In yet another aspect, a cable tensioning assembly having a case and an integrated spring/vibration clamp arrangement that may provide two unique, independent clamping points on the case, rather than against gripping members. Such aspect may allow for greater security and more holding power as to the elongate member.

In still another aspect, a cable tensioning assembly may have an axial engagement feature whereby a primary and secondary clamp can be pulled in simultaneously so that only one motion or adjustment need be made to affect both clamps. Such aspect may yield greater flexibility in elongate member dimensions, including cable diameter, that can be effectively used. For example, a nominal ⅛ cable can vary by 10% in diameter with this type of arrangement.

Another aspect may be a cable tensioning assembly, for securing at least one elongate member is provided, comprising: a case having a first side and an opposing second side with a first and a second curved cavity, respectively; and, a central cavity between the first and second curved cavities, with a connector disposed within the central cavity and wherein the connector comprises a top spring cap element and a bottom spring cap element with a post therebetween, wherein the top spring cap element and the bottom spring cap element are adapted to secure the at least one elongate member against the case by connecting the top spring cap element and a bottom spring cap element to each other.

In another aspect, the top spring cap element and the bottom spring cap element restrain each other in the case and are not connected to the case.

In another aspect, the top spring cap element and the bottom spring cap element are held in the central cavity by friction.

Another aspect may be method of using a cable tensioning assembly, for securing at least one elongate member, comprising: sliding the at least one elongate member through a front cable insertion hole of the cable tensioning assembly; sliding the at least one elongate member through a front cable exit hole of the cable tensioning assembly; performing one of: looping the at least one elongate member through the cable tensioning assembly by looping the at least one elongate member back through the cable tensioning assembly by inserting the at least one elongate member through a back cable insertion hole of the cable tensioning assembly, and, sliding the elongate member through a back cable exit hole of the cable tensioning assembly; or connecting at least one elongate member to a second elongate member by, inserting the second elongate member into the back cable insertion hole, and, inserting the second elongate member through the back cable exit hole of the cable tensioning assembly; activating a connector to lock the at least one elongate member and/or the second elongate member in the cable tensioning assembly.

In another aspect, the method further comprises adjusting tension on the at least one elongate member and/or the second elongate member.

In another aspect, the method further comprises releasing the at least one elongate member from the cable tensioning assembly.

In another aspect, the connector includes a screw and at least one gripping clamp.

In another aspect, the connector includes two interconnecting spring cap elements.

The aforementioned embodiments are but a few examples of configurations of the systems, apparatuses, and methods disclosed herein. Further understanding and a detailed coverage of example embodiments follows.

BRIEF DESCRIPTION OF DRAWINGS

Many aspects of the present disclosure will be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. It should be recognized that these implementations and embodiments are merely illustrative of the principles of the present disclosure and may not necessarily be according to scale. Therefore, in the drawings.

DETAILED DESCRIPTION

Figure 1:
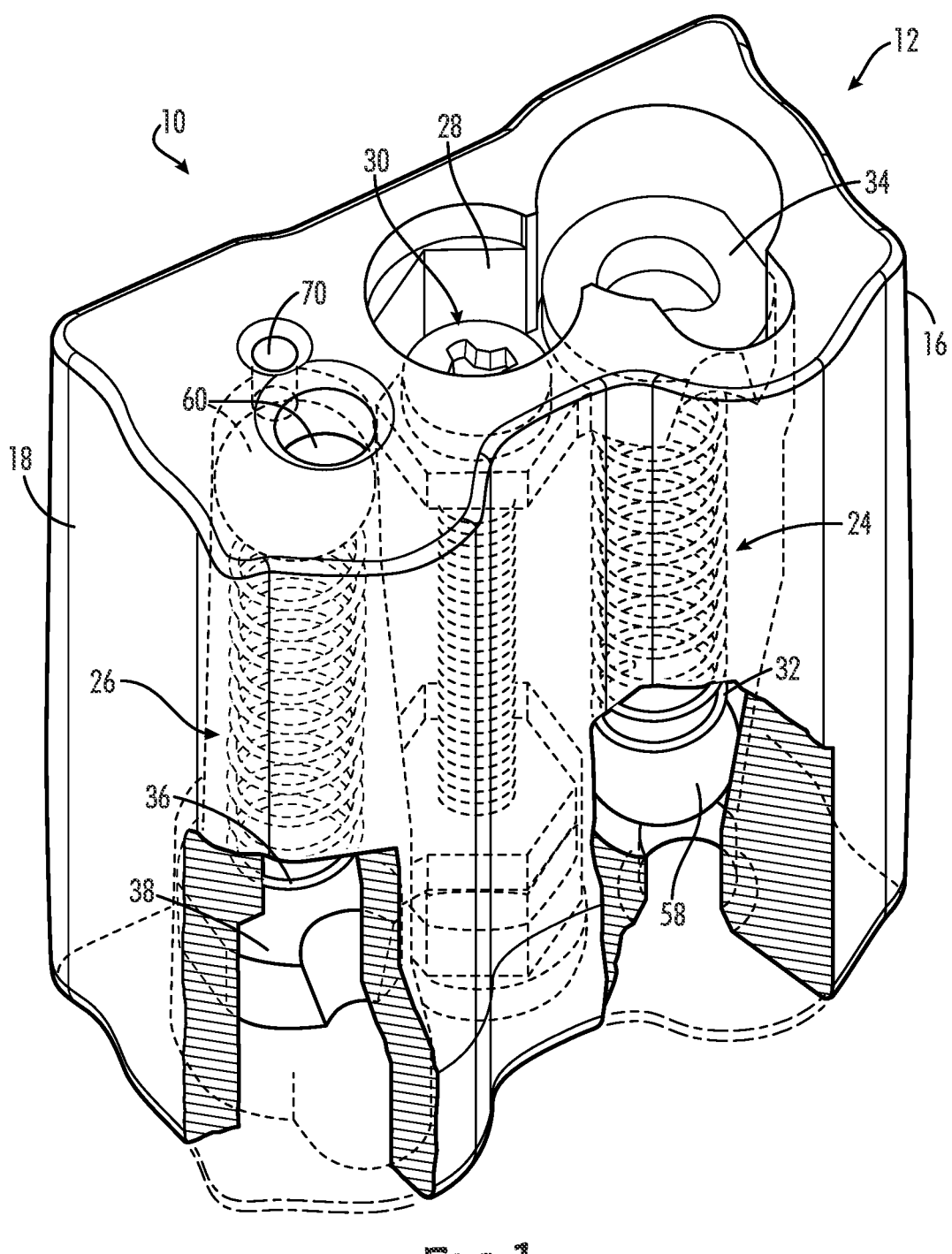
FIG. 1, FIG. 2, FIG. 3, and FIG. 4 illustrate various perspective views of an example of the presently disclosed cable tensioning assembly.
Figure 2:
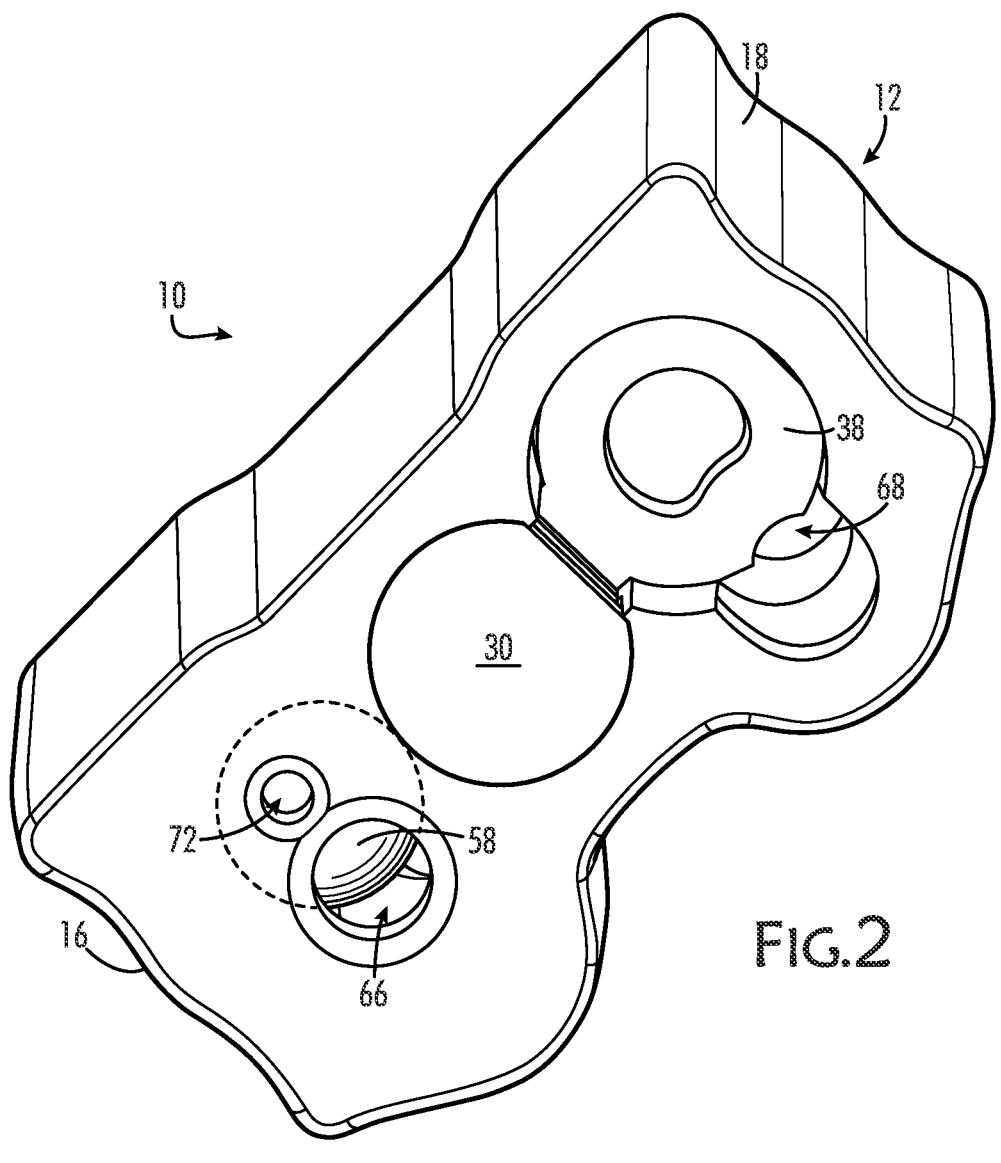

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the subject matter herein.

Generally, some embodiments of the present invention include a two-way cable grip apparatus (a "cable tensioning assembly") with a Dynamic Vibration Arrest (DVA) feature. The DVA feature, as described in more detail herein, ensures the entire apparatus vibrates in unison with the cable(s). Without the DVA feature, in the case of wind or other vibration, a cable grip can shake loose, allowing the tie to fail. DVA prevents vibration failure. The cable tensioning assembly can be used to couple cables together or form a loop, allowing for the cable to be passed through/around a lash point to fix structures/assemblies. Once the cable(s) have been passed through the cable tensioning assembly, the DVA feature is engaged in some embodiments of the invention by twisting (clockwise) a set screw. Once completed, the wire is clamped to the case of the cable tensioning assembly, keeping the cable tensioning assembly from vibrating independent of the cable in windy or other conditions that cause oscillations. The following provides more detailed description of and for use of the cable tensioning assemblies described herein.

In some embodiments, the presently disclosed subject matter provides cable tensioning assembly and method of using same. For example, the presently disclosed cable tensioning assembly may include a case that may hold two elongate members, or one elongate member looped back through, firm in place, allowing load to be applied.

In another embodiment, the presently disclosed cable tensioning assembly for holding elongate members may have a cable tensioning case or housing with two symmetrical sides, and each side may have a one-way cable pull function, providing load resistance.

In still another embodiment, the presently disclosed cable tensioning assembly for holding elongate members in place in a case may have a vibration arrest arrangement. In one embodiment, a vibration arrest arrangement may include a primary and a secondary clamp. When such vibration arrest arrangement is engaged, a secondary clamp may be pulled into place such that an elongate member becomes locked to the case of the cable tensioning assembly.

In another embodiment, the presently disclosed cable tensioning assembly may have a vibration arrest feature that may provide additional resistance such that elongate members held by the cable tensioning assembly have no motion in either direction with relation to the case of the cable tensioning assembly and/or the cable tensioning assembly becomes a zero-way cable pull that will vibrate in harmony with the elongate member. In still another embodiment, the presently disclosed cable tensioning assembly may hold an elongate member in place such that when external stresses, including weather events, that cause movement or vibration, act on the elongate member, the cable tensioning assembly will move in sync with the elongate member.

In yet another embodiment, the presently disclosed cable tensioning assembly may have a gripping feature is provided that may prevent elongate members from becoming loose, that may add slack to the elongate members, or that may tighten the elongate member with a ratchet-like effect.

In still another embodiment, the presently disclosed cable tensioning assembly may have a dynamic clamp feature with a primary and secondary clamp mechanism that may prevent elongate members from becoming loose, that may add slack to the elongate members, or that may tighten the elongate member with a ratchet-like effect.

Another embodiment of the presently disclosed cable tensioning assembly may have an axial design allowing for a part of the assembly to be made by a casting process without orthogonal axis relief (i.e., molds that can be opened in two directions).

In still another embodiment, the presently disclosed cable tensioning assembly may have an integrated spring/vibration clamp arrangement for both holding a clamping member and spring or urging member in place, and for clamping an elongate member to the cable tensioning housing or case. In prior arrangements, one part of such assemblies served to hold a spring or urging member, whereas a different part served to provide the clamping force.

In yet another embodiment, the presently disclosed cable tensioning assembly with gripping members for securing elongate members may have a case and an integrated spring/vibration clamp arrangement that may provide two unique, independent clamping points on the case, rather than against gripping members. Such embodiment may allow for greater security and more holding power as to the elongate member.

In still another embodiment, the presently disclosed cable tensioning assembly may have an axial engagement feature whereby a primary and secondary clamp can be engaged simultaneously so that only one motion or adjustment need be made to affect both clamps. Such embodiment may yield greater flexibility in elongate member dimensions, including cable diameter, that can be effectively used. For example, a nominal ⅛ cable can vary by 10% in diameter with this type of arrangement.

Figure 3:
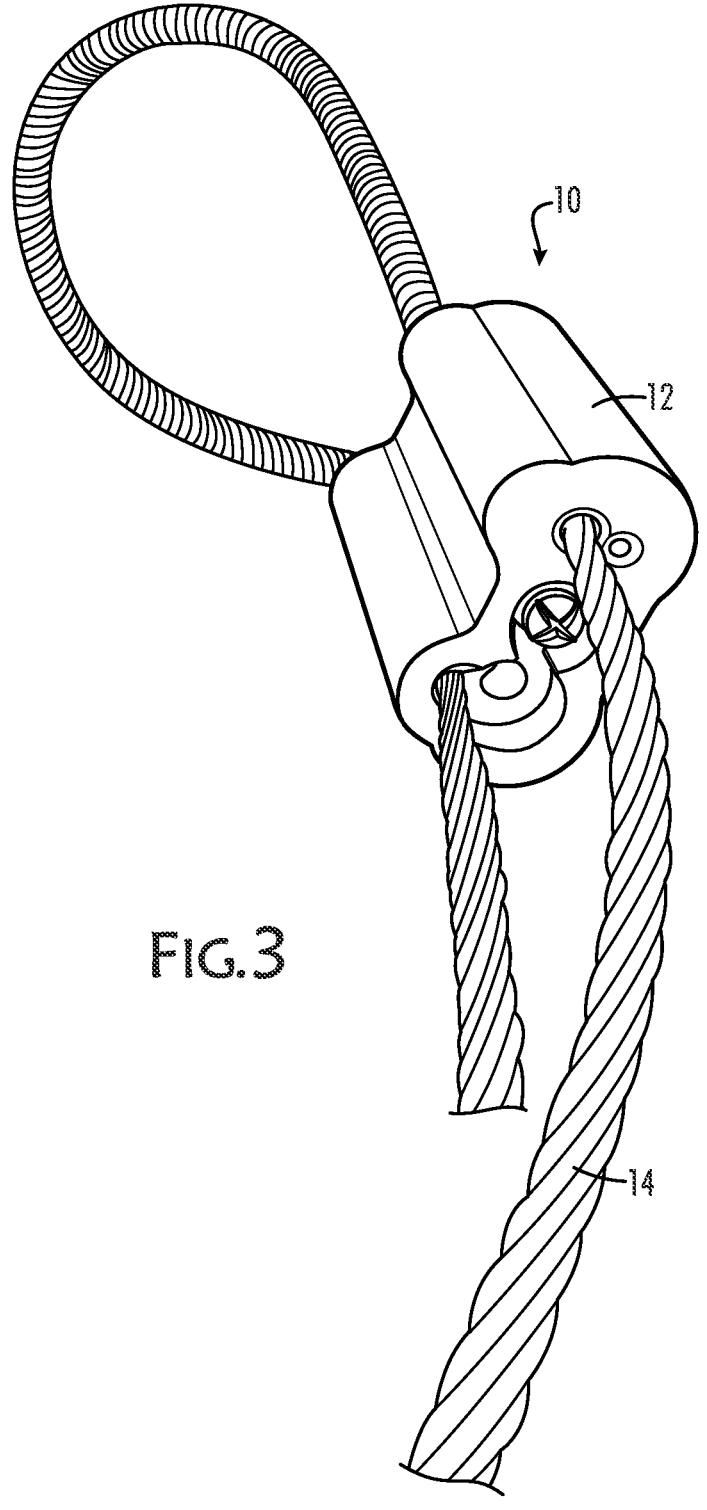
Figure 4:
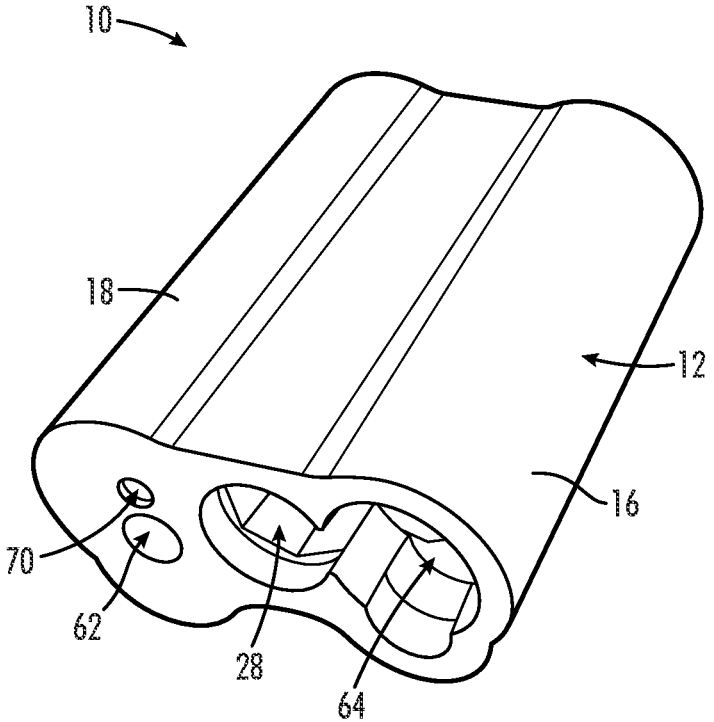

Referring now to the drawings, FIGS. 1-6 illustrate various perspective views of an exemplary embodiment of the presently disclosed cable tensioning assembly 10. As shown, cable tensing assembly 10 may include a case 12 for holding one or more elongate members 14 (FIG. 3). In the exemplary embodiment, an elongate member 14 is looped back through the case 12. In some embodiments, two elongate members 14 are connected to each other using the cable tensioning assembly 10. In an embodiment of the invention, an elongate member 14 is threaded through a front cable insertion hole 62, through the cable tensioning assembly 10, and out of the front cable exit hole 68. In embodiments where the elongate member 14 is looped, the tip of the elongate member 14 is then passed back through the cable tensioning assembly 10 by passing it through the back cable insertion hole 66 and out the back cable exit hole 64.

In embodiments where two elongate members 14 are being connected together, a first elongate member passes into the front cable insertion hole 62 and out the front cable exit hole 68 and a second elongate member passes into the back cable insertion hole 66 and out the back cable exit hole 64, whereby the cable tensioning cable assembly 10 functions as an end to end connector for both elongate members.

Figure 5:
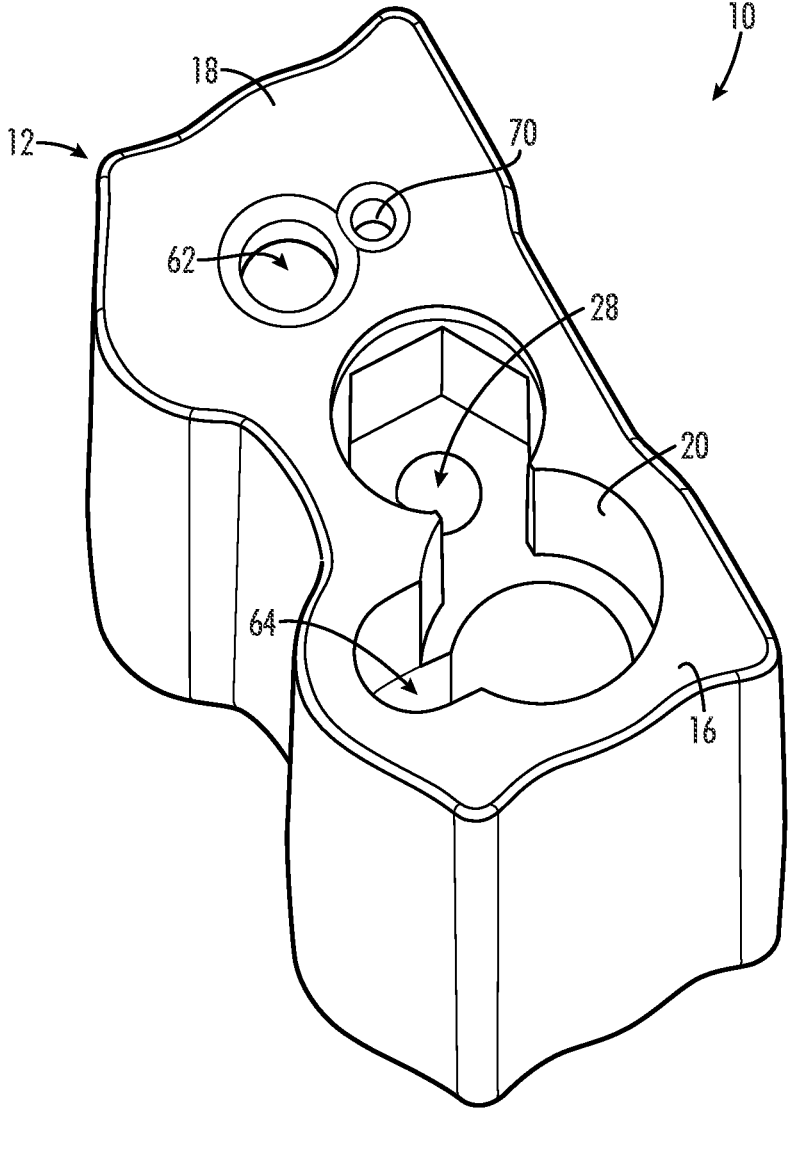
FIG. 5 and FIG. 6 illustrate various perspective view of an example of a case of the presently disclosed cable tensioning assembly.
Figure 6:
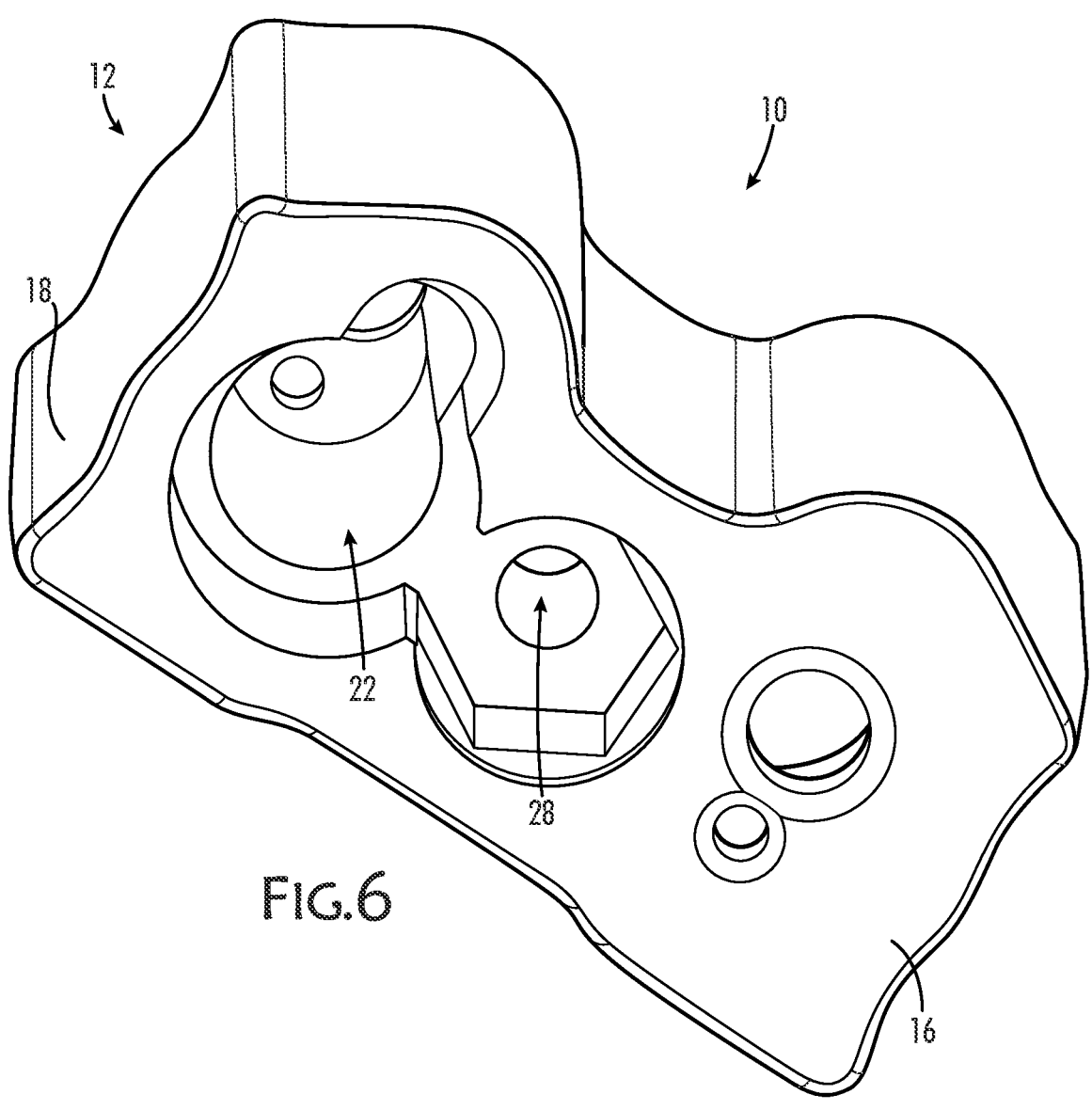
Figure 7A:
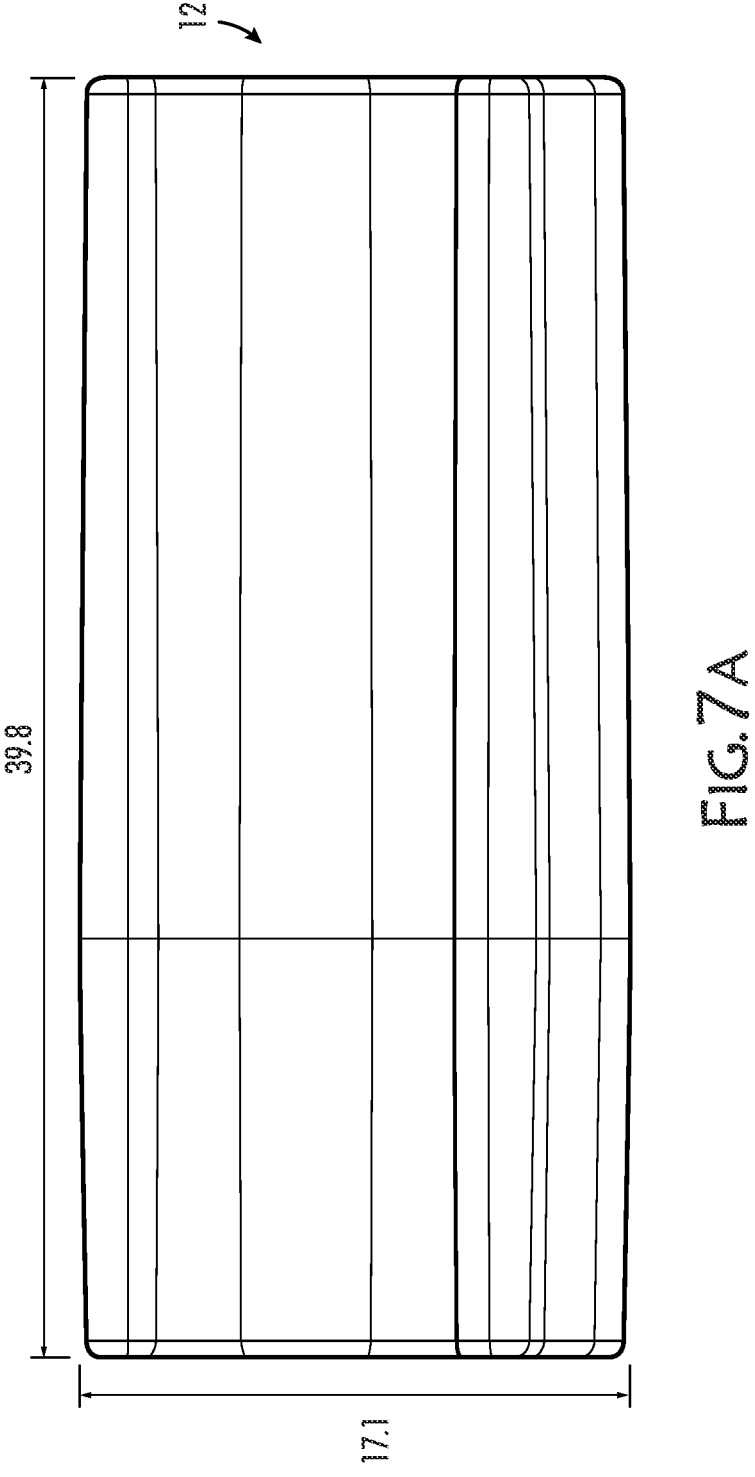
FIGS. 7A and 7B illustrate side views of an example of the presently disclosed cable tensioning assembly.
Figure 7B:
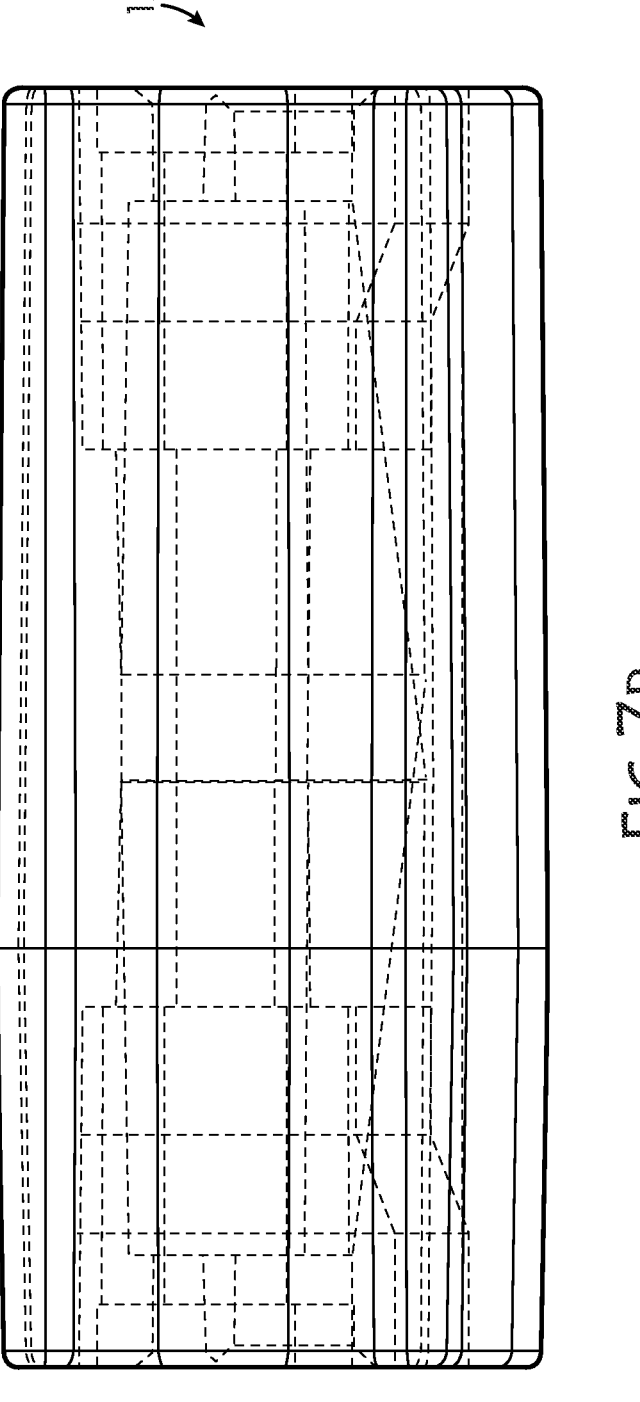
Figure 8A:
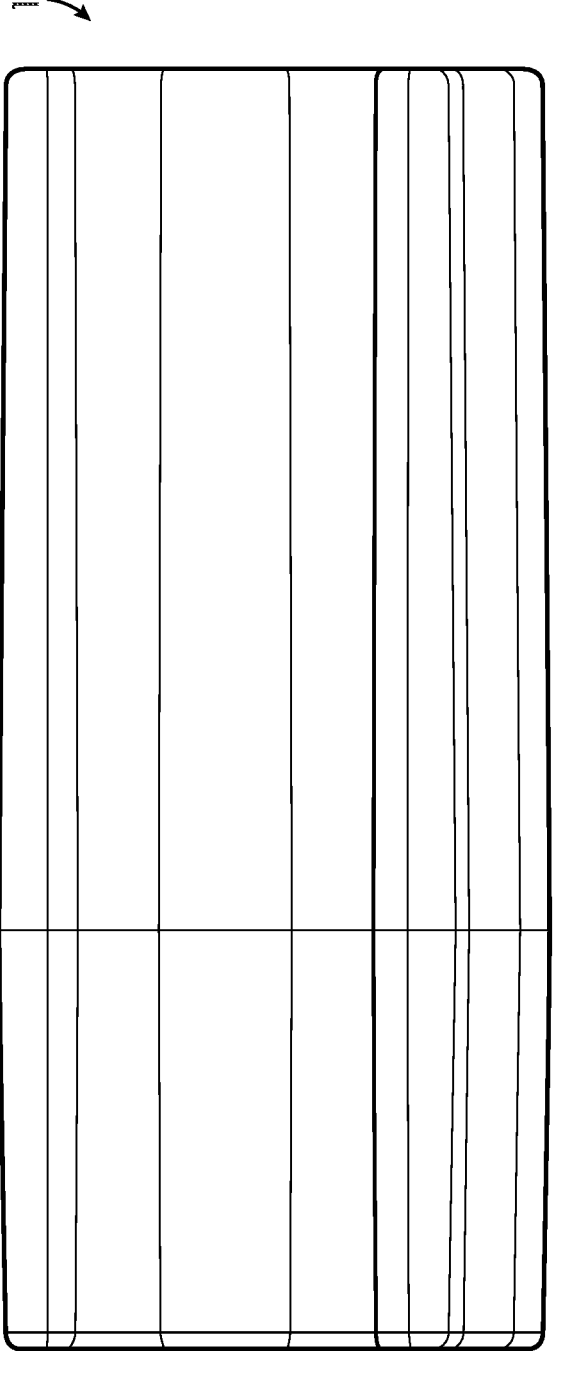
FIGS. 8A and 8B illustrate top views of an example of the presently disclosed cable tensioning assembly.
Figure 8B:
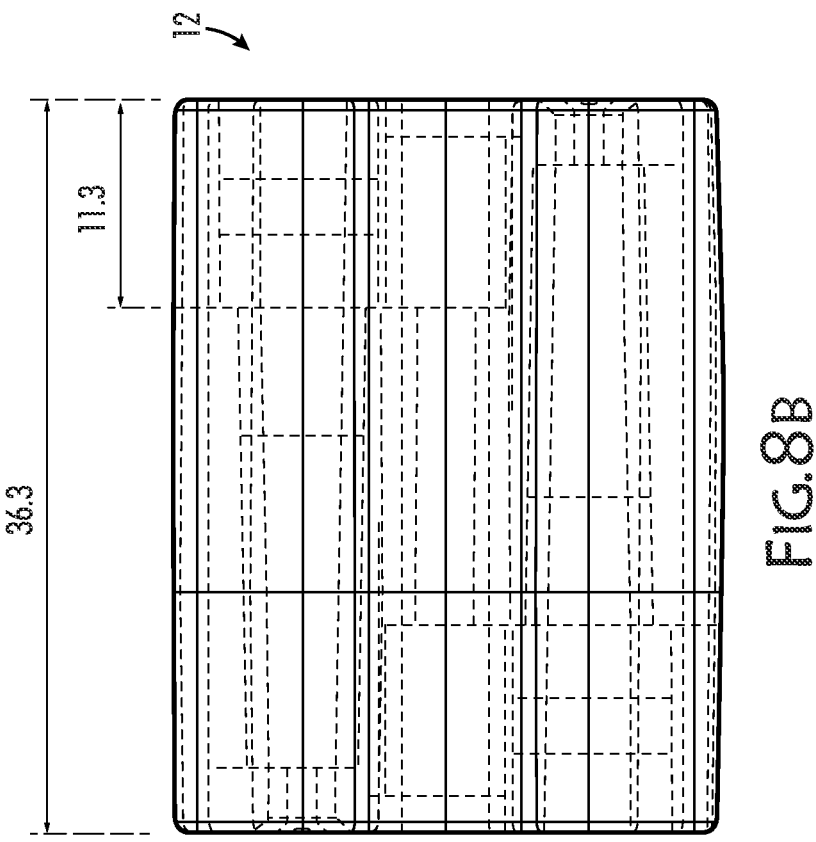
Figure 9:
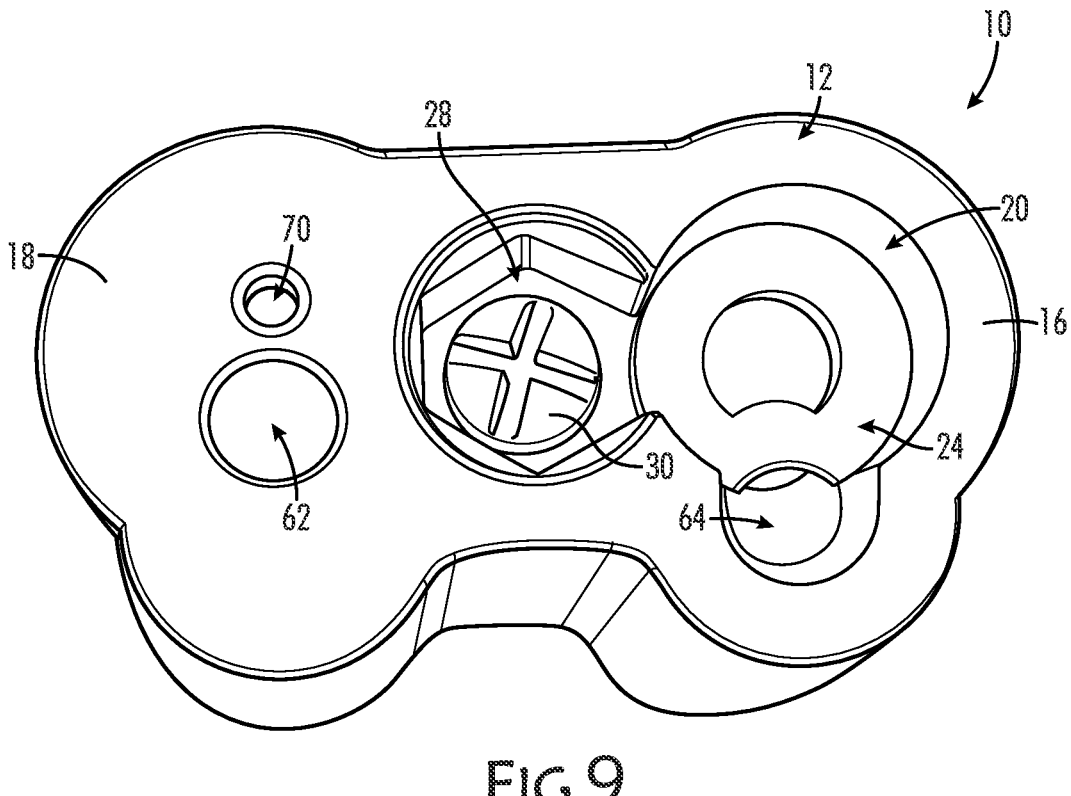
FIG. 9, FIG. 10, FIG. 11, and FIG. 12 illustrate front views of an example of the presently disclosed cable tensioning assembly.
Figure 10:
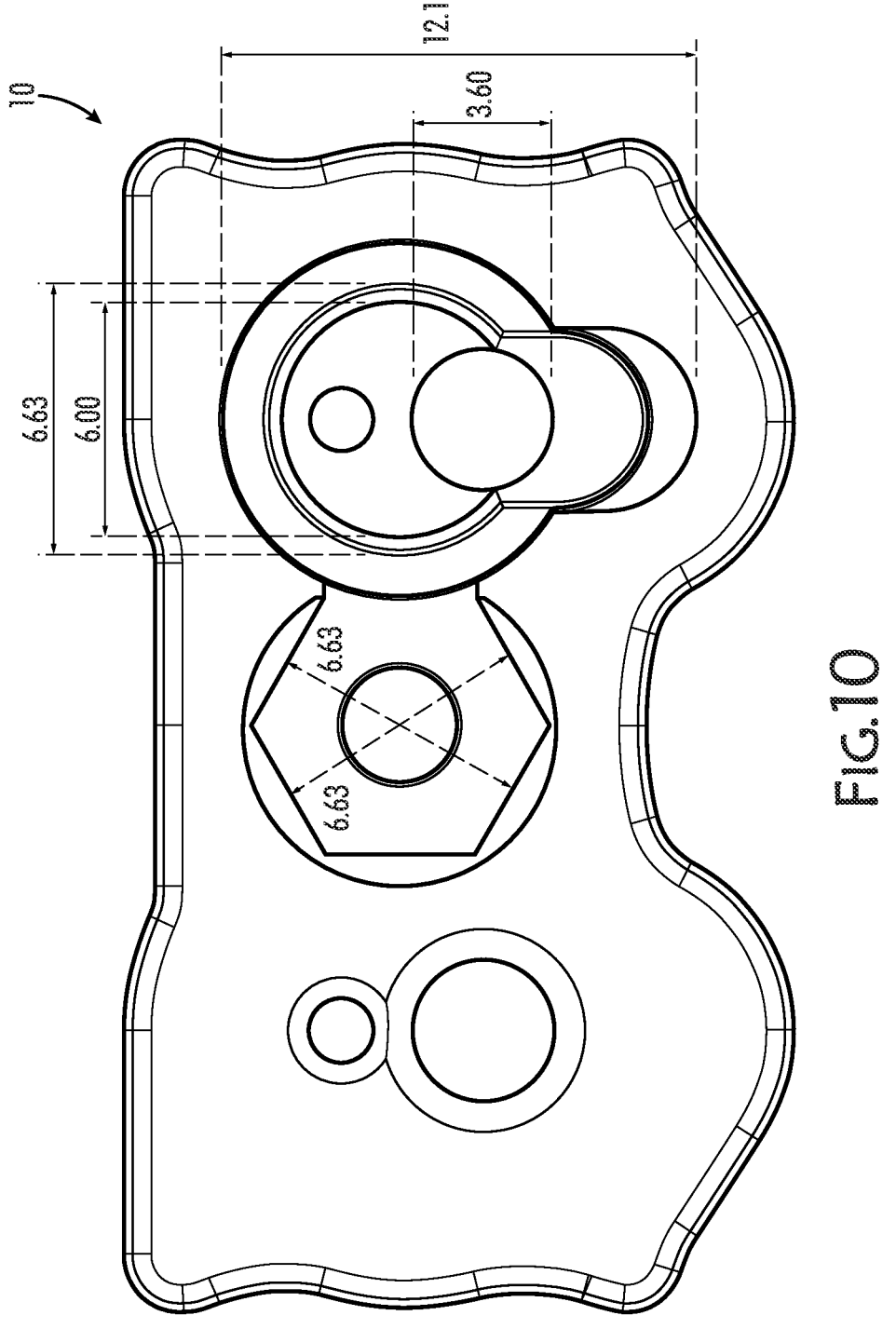
Figure 11:
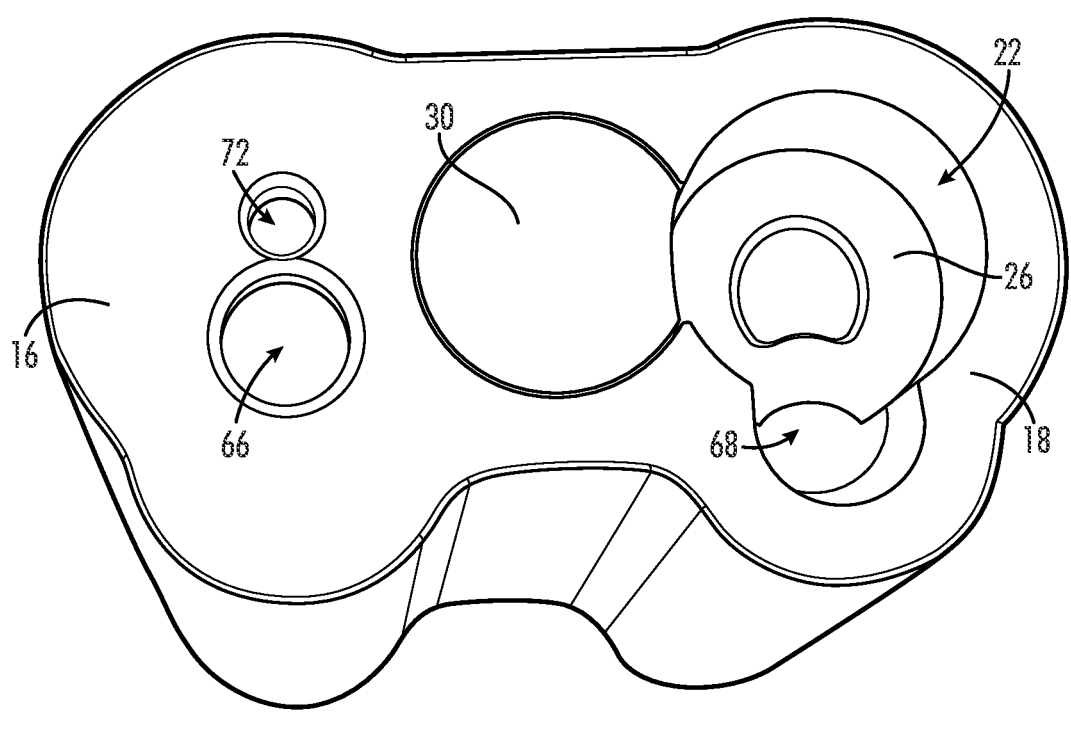
Figure 12:
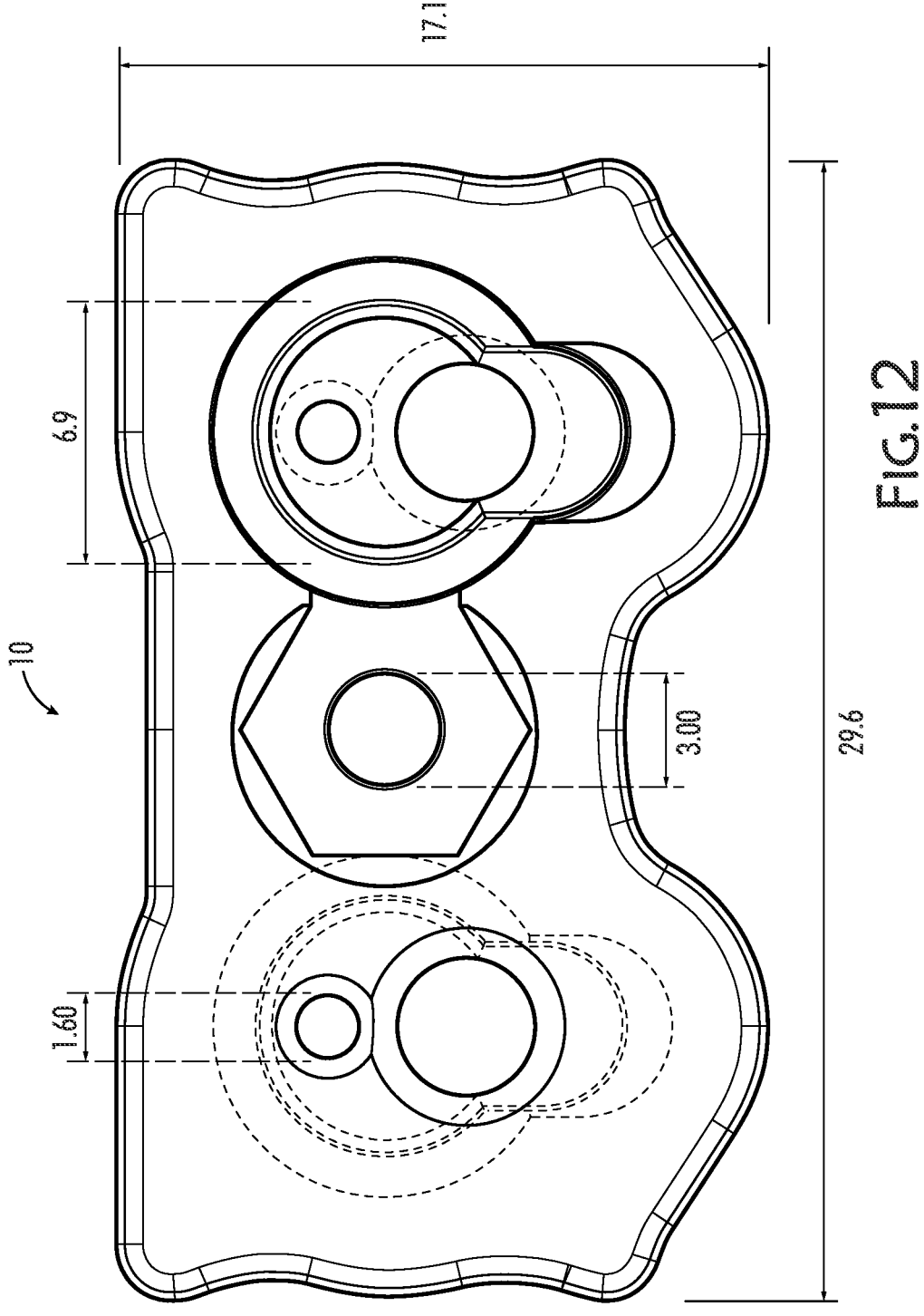
Figure 13A:
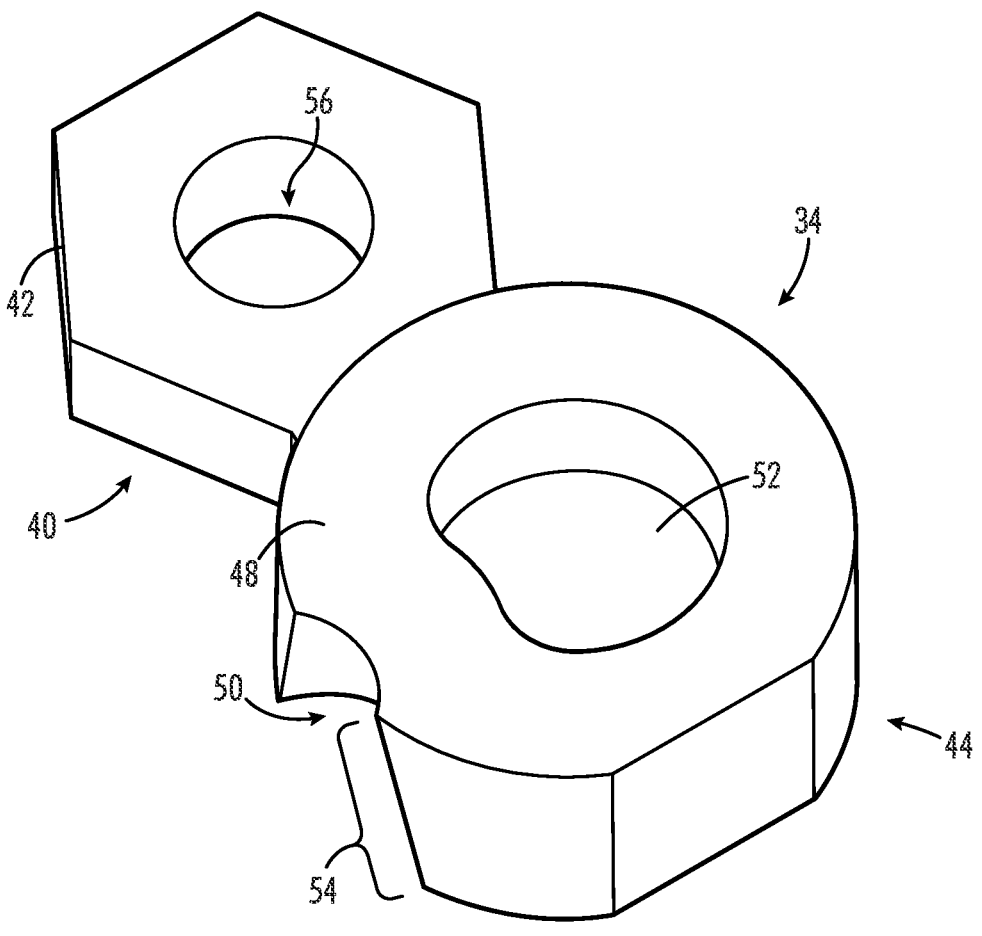
FIGS. 13A and 13B illustrate various perspective views of an example of a clamp of the presently disclosed cable tensioning assembly.
Figure 13B:
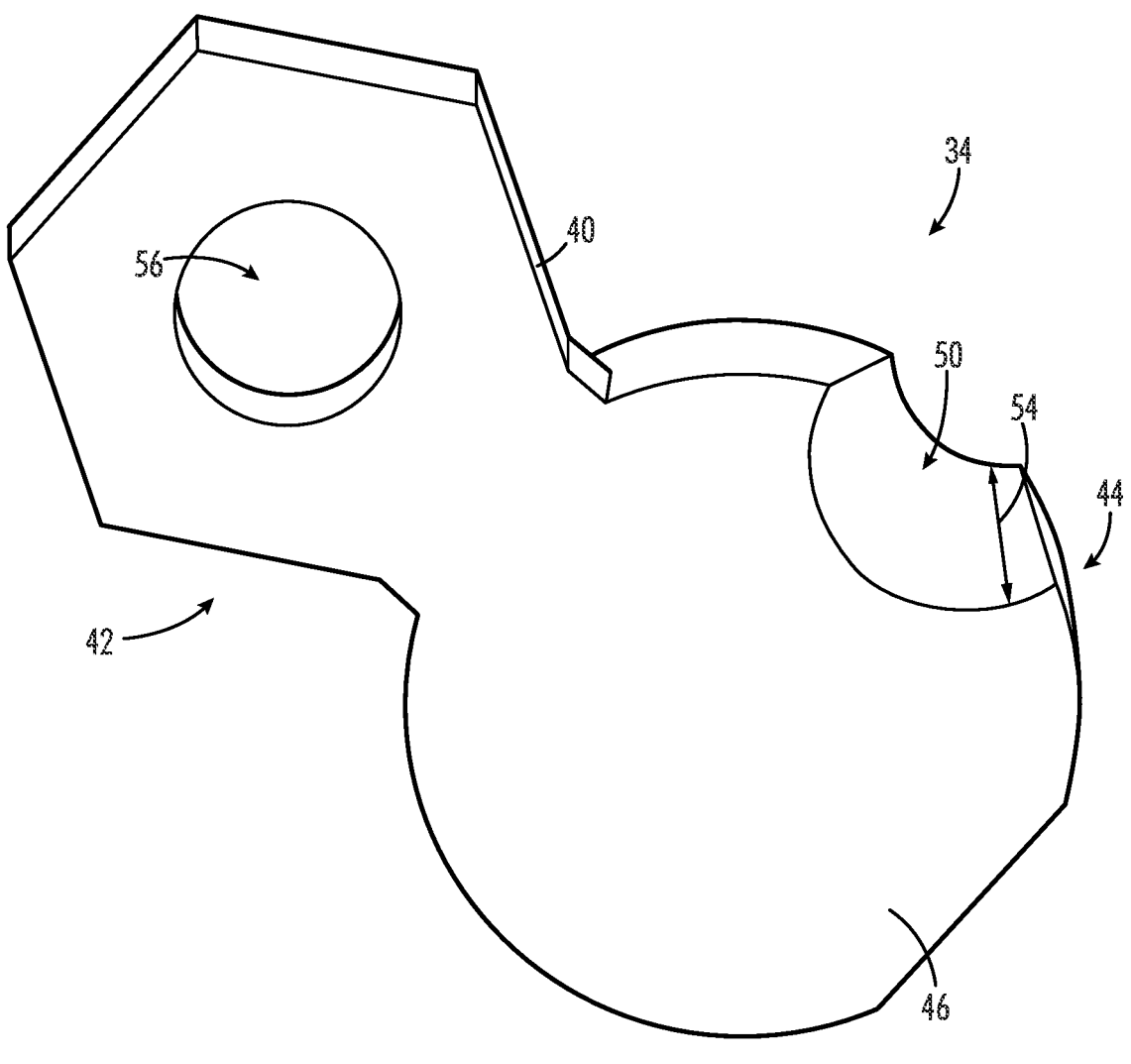
Figure 14A:
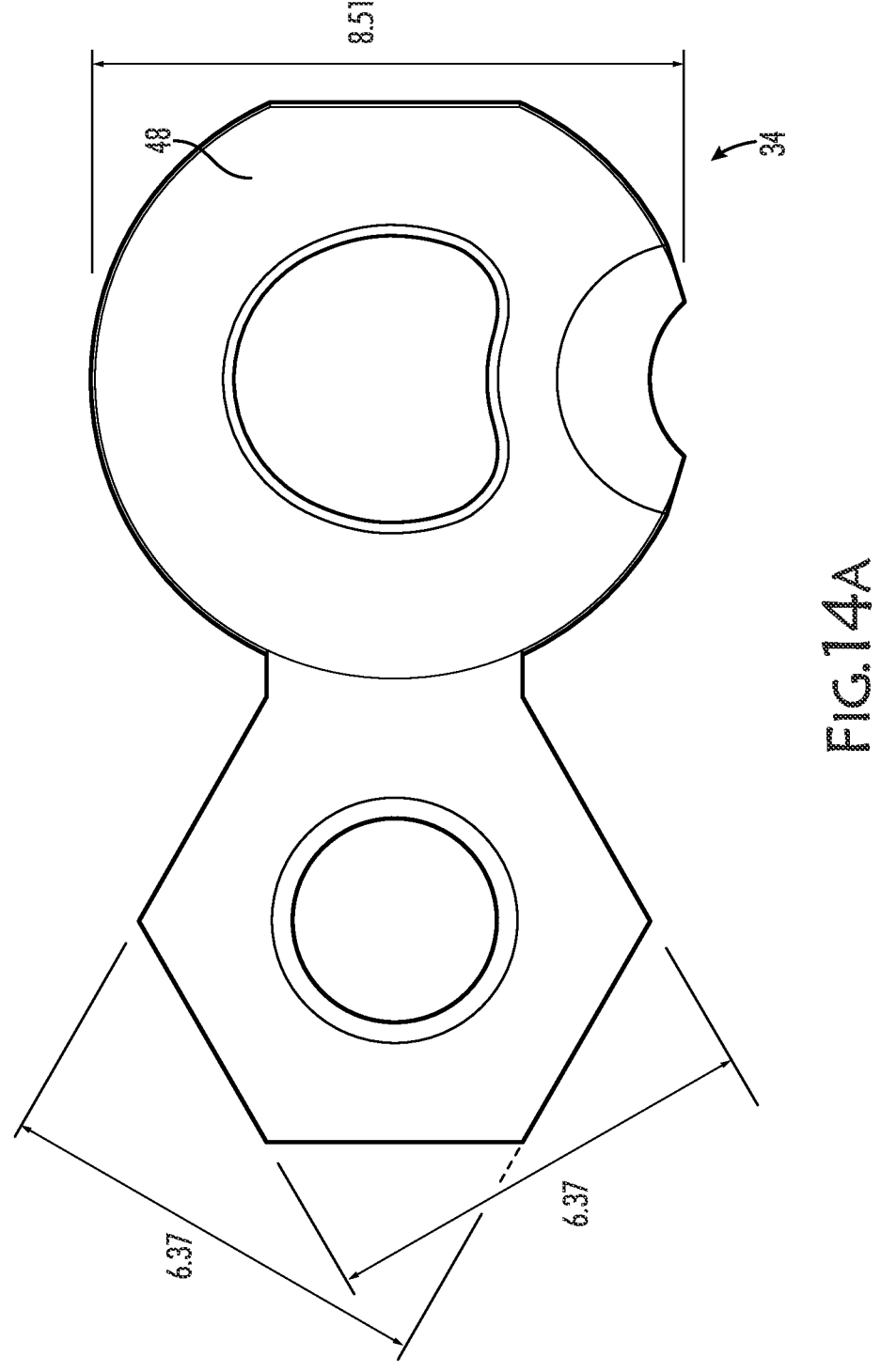
FIGS. 14A and 14B illustrate top views of an example of a clamp of the presently disclosed cable tensioning assembly.
Figure 14B:
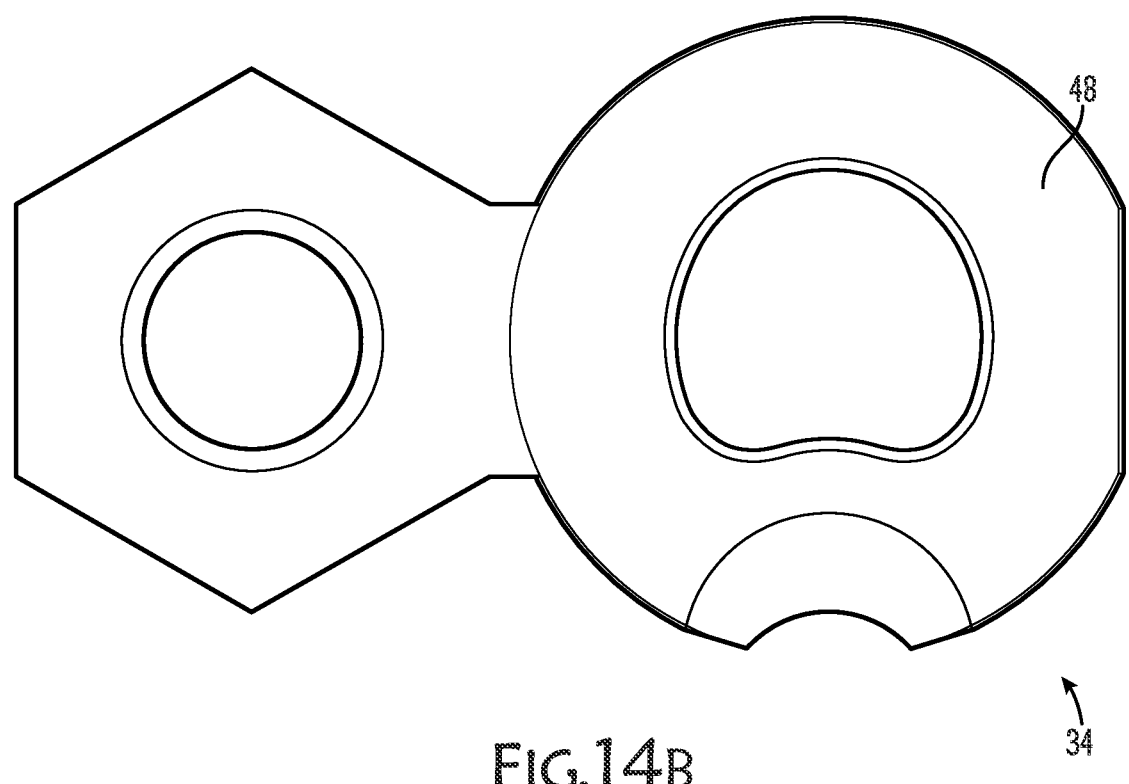
Figure 15A:
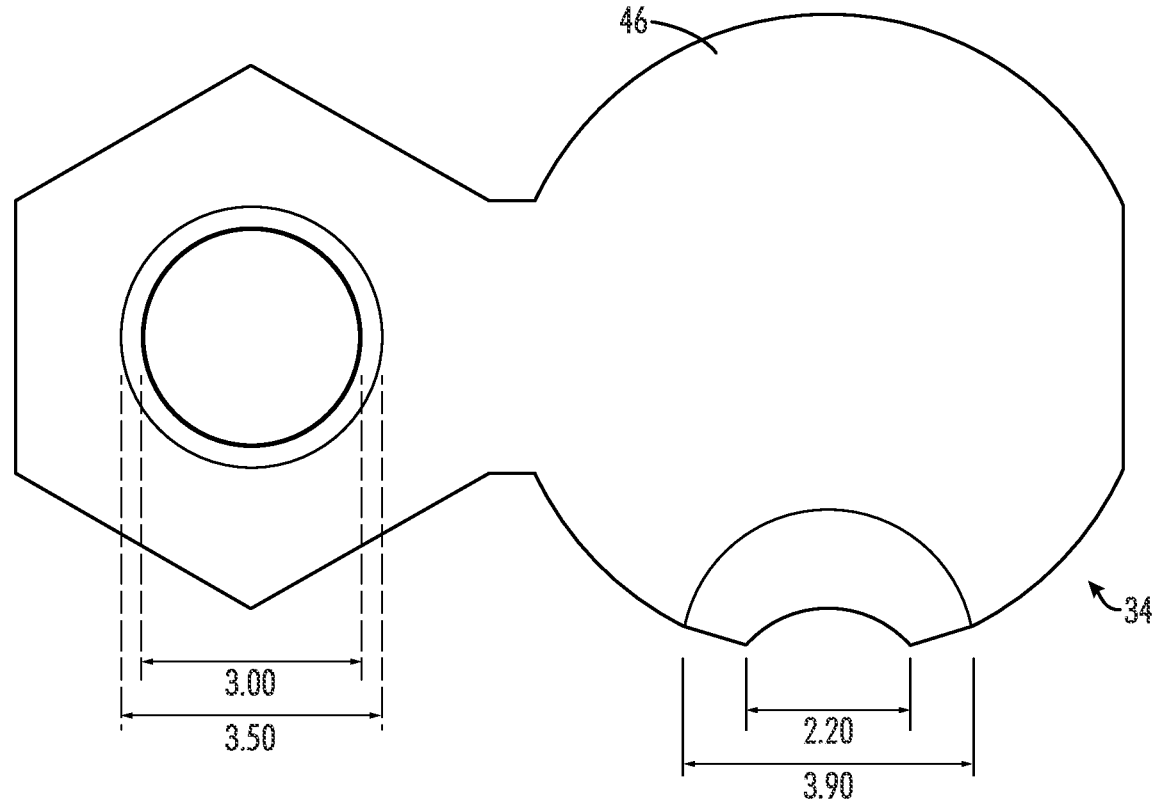
FIGS. 15A and 15B illustrate bottom views of an example of a clamp of the presently disclosed cable tensioning assembly.
Figure 15B:
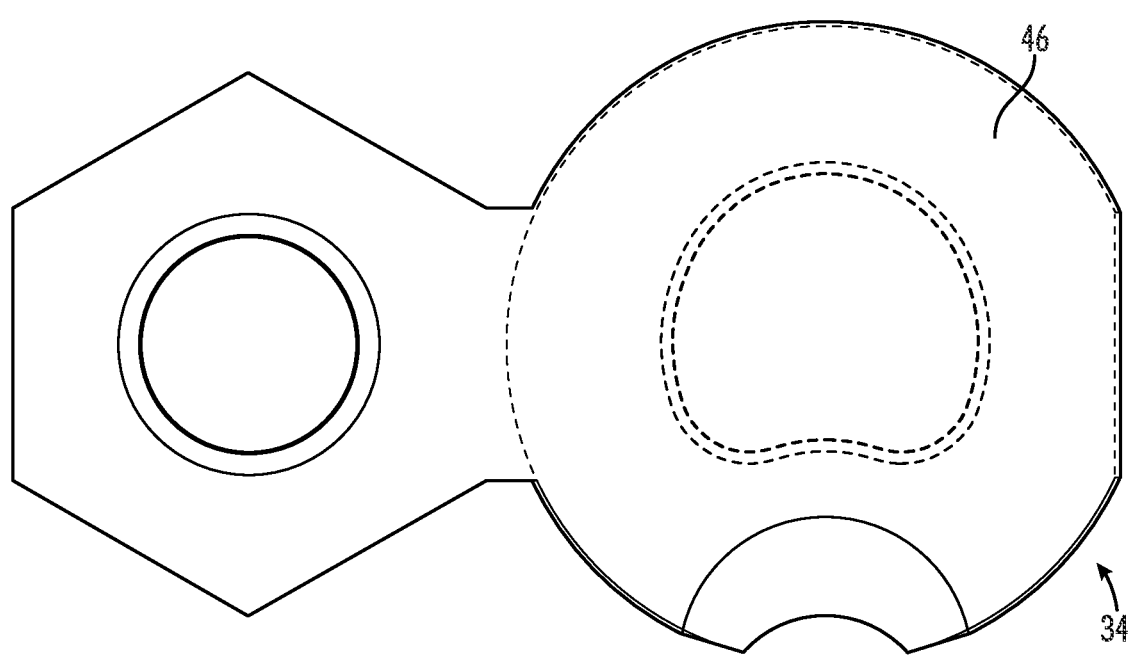
Figure 16A:
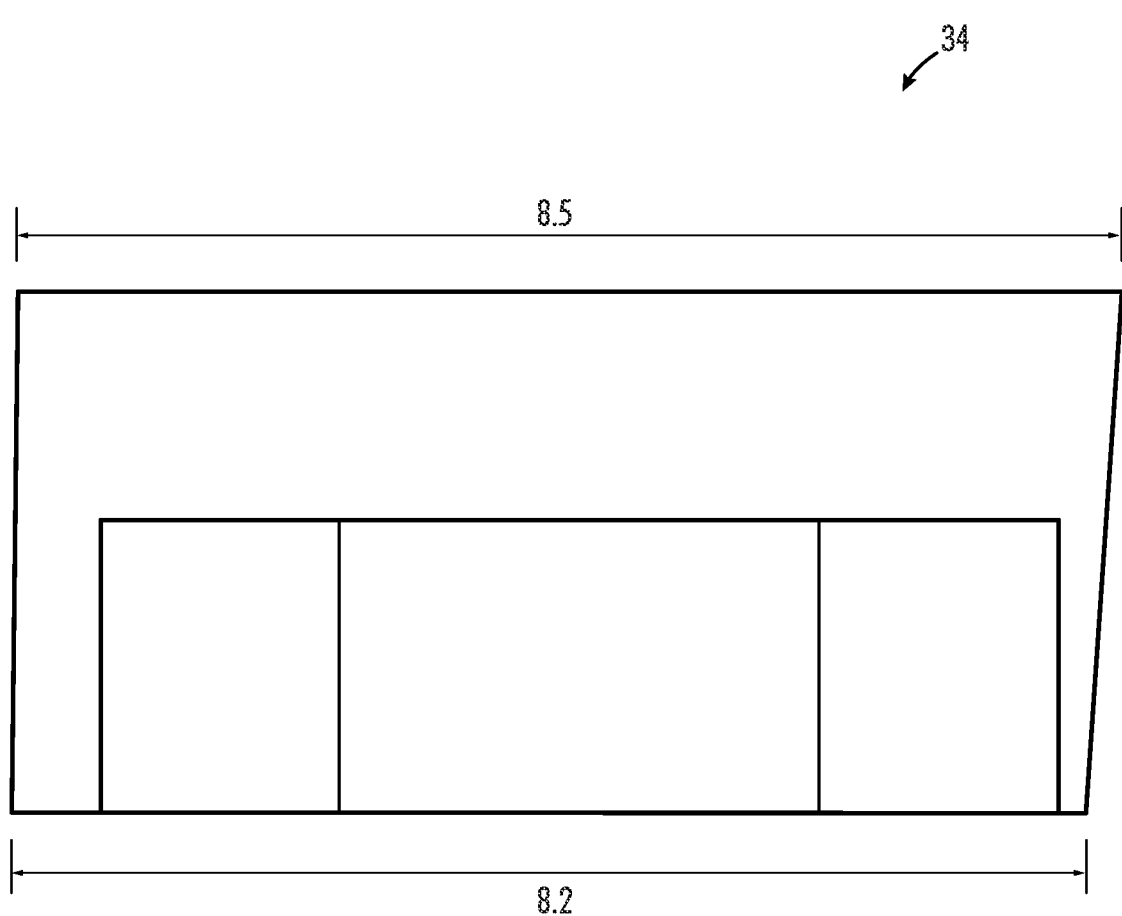
FIGS. 16A and 16B illustrate front views of an example of a clamp of the presently disclosed cable tensioning assembly.
Figure 16B:
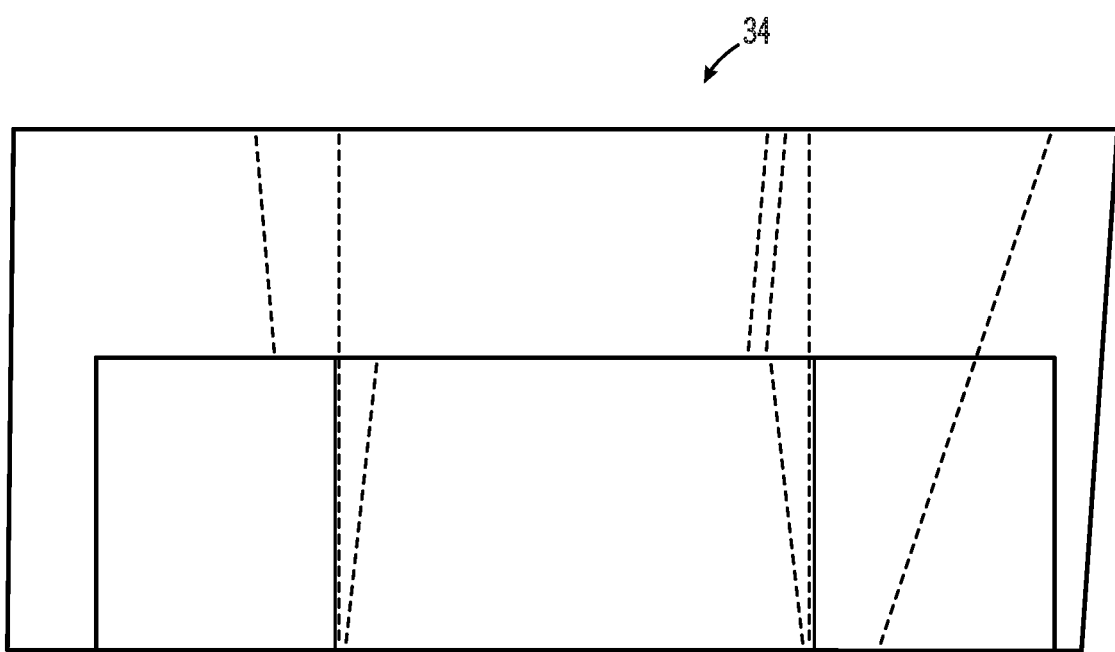
Figure 17A:
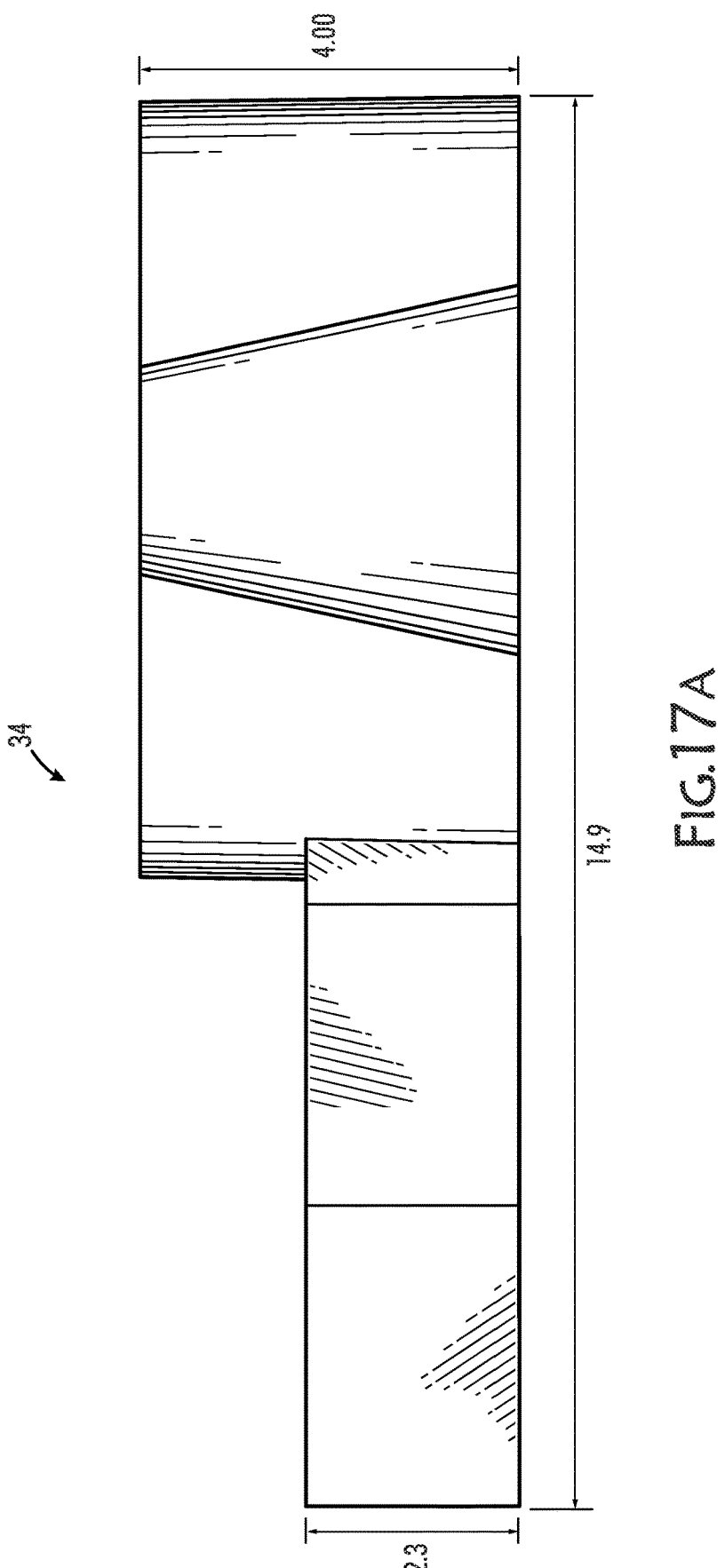
FIGS. 17A and 17B illustrate side views of an example of a clamp of the presently disclosed cable tensioning assembly.
Figure 17B:
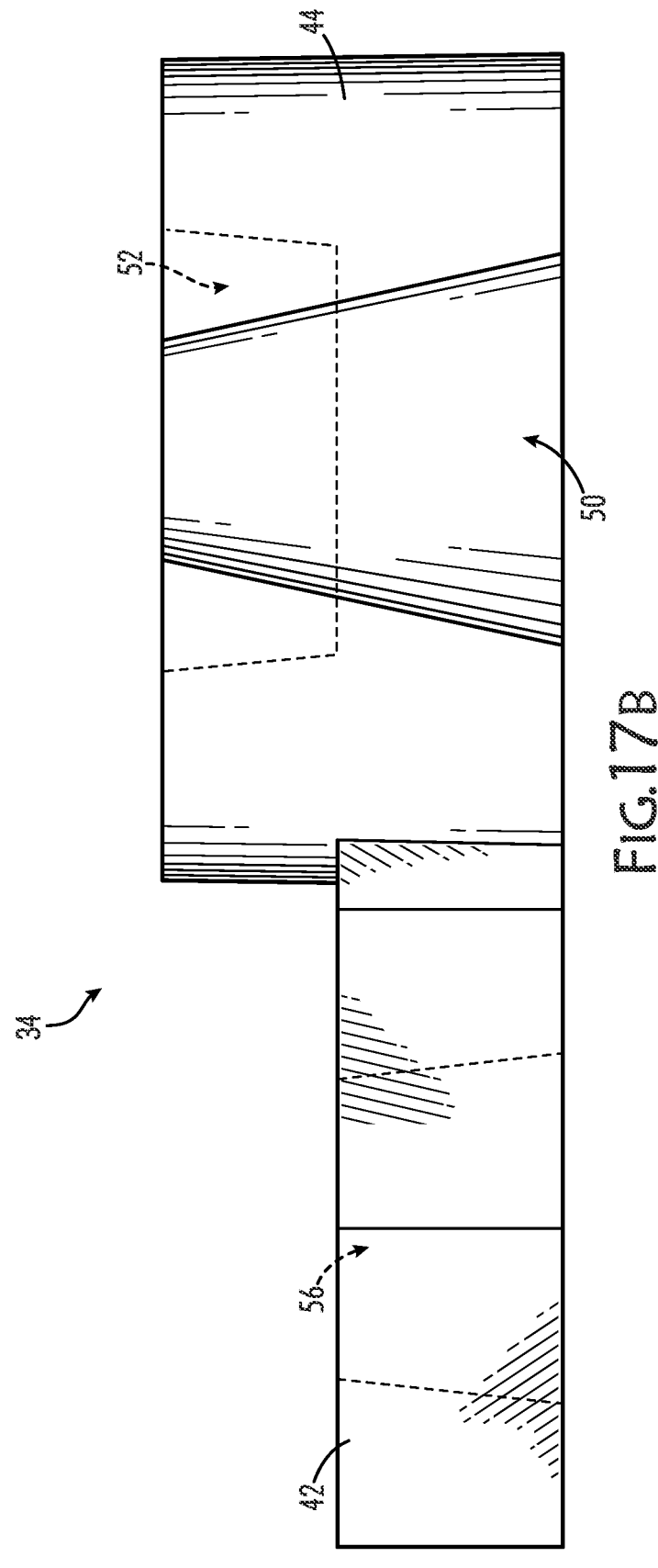

FIGS. 5 and 6 illustrate more fully an exemplary embodiment of case 12. Various views and features of one embodiment of case 12, including exemplary dimensions, are shown in FIGS. 7A-8B. The case 12 may include two symmetrical sides 16, 18, each side with a curved cavity 20, 22, respectively, for receiving a gripping arrangement 24, 26, respectively. As further shown, in one embodiment, each cavity 20, 22, may be connected by a central cavity 28 for receiving a connector 30 for the gripping arrangements 24, 26. These gripping arrangements 24, 26 may be vertically oriented in opposing directions within the cavities 20, 22.

In one embodiment of cable tensioning assembly 10, shown in FIGS. 1-4, and 8-12, each gripping arrangement has a one-way cable pull function for providing load resistance on elongate member 14. Further, in one embodiment one gripping arrangement 24 includes a first urging member or spring 32 and a first vibration clamp 34 that is integrated by connector 30, such as a central screw, with a second spring 36 and second vibration clamp 38 of the other gripping arrangement 26. In some embodiments of the invention, there is a roller 58, 60 disposed at the end of each spring 32, 36, respectively, to facilitate movement of at least one elongate member 14 through the cable tensioning assembly 10.

In some embodiments of the invention, a grip release 70, 72 is provided to each side of the cable tensioning assembly 10, wherein application of pressure (for example, using a thin implement, such as a pin or screwdriver) through the grip release aperture, and optionally into a roller, helps to release the grip of the assembly 10 on an elongate member 14.

The features of one embodiment of vibration clamping members 34, 38 are illustrated in FIGS. 13A-17B, including exemplary dimensions. As shown, clamp 34 may include a body 40 having an angled end, such as hexagonal side connected to an opposing curved end 44. Along the edge of the curved end 44, clamp 34 may include a concave portion 50 or groove. In one embodiment, such concave portion 50 may be include a taper 54 from one side 46 of clamp 34 to the opposing side 48. Further, in one embodiment, one side 48 of clamp 34 may include a recess 52 at the center of curved end 44 of the clamp. In one embodiment, angled end 42 may include a central opening 56.

Figure 20:
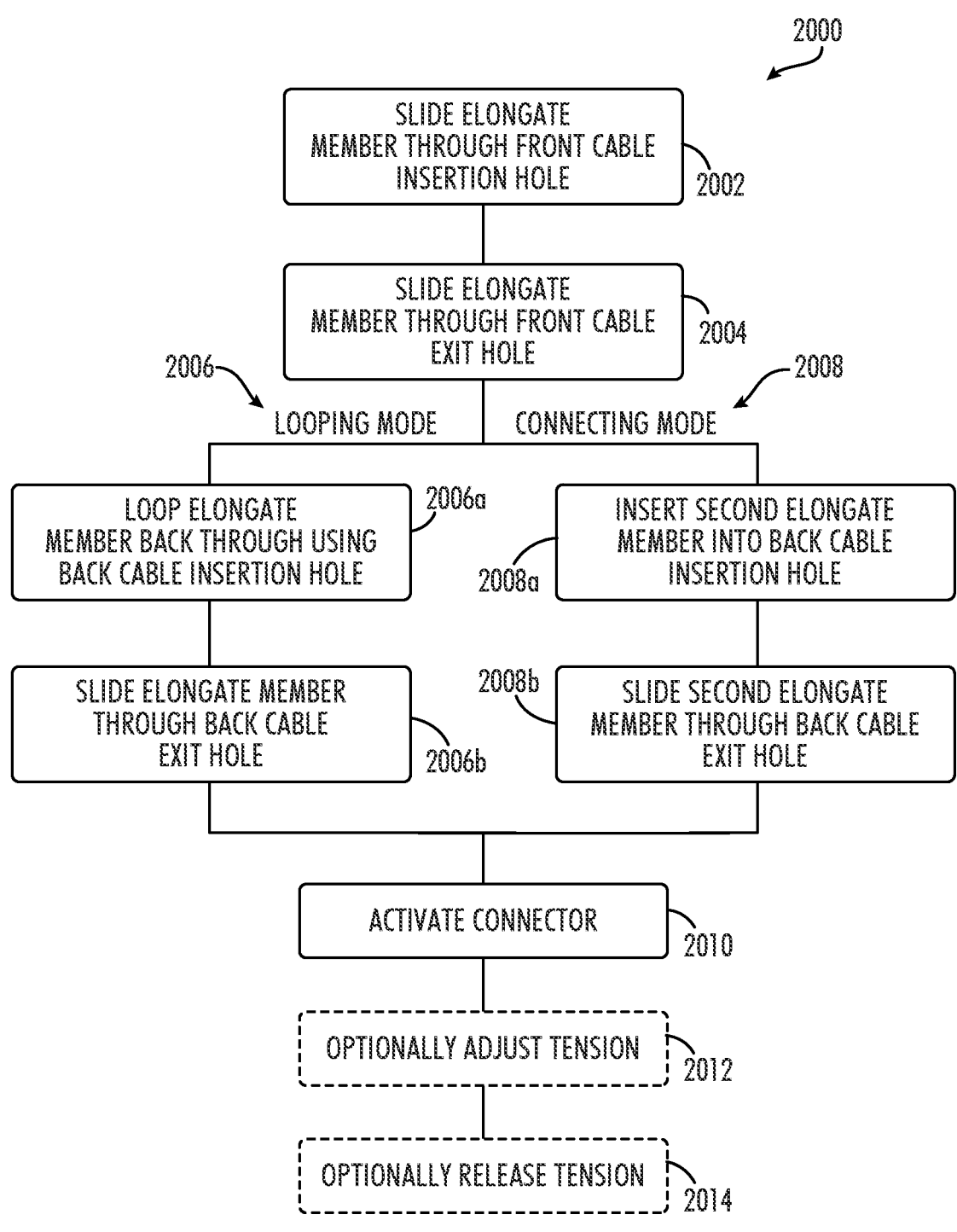
FIG. 20 is a flowchart of a method of using a cable tensioning assembly of FIGS. 1-6 and 9-17B; and, FIG. 21 is a flowchart of a method of using a cable tensioning assembly of FIGS. 18-19B.

FIG. 20 is a flowchart 2000 of a method of using the cable tensioning assembly 10 of FIGS. 1-6 and 9-17B, in an exemplary embodiment of the invention. In typical applications, there are two primary modes of use. The first is a "looping" mode where an elongate member 14 (e.g. cable, steel wire rope) is fixed to a frame or structure, then run to a separate point and looped through the cable tensioning assembly and back towards and through the cable tensioning assembly (See, for example, FIG. 3). The second is a "connecting" mode where two elongate members 14 are connected together in a functionally "end to end" arrangement using the cable tensioning assembly 10. Additional details regarding these two modes of use are described herein and below.

In an embodiment of the invention, the elongate member 14 is slid through the cable tensioning assembly 10 with the connector 30, such as a central screw, facing the origin. Once the elongate member 14 is slid (2002) through the front cable insertion hole 62 and slid (2004) through the front cable exit hole 68 and, in the "looping" embodiment 2006, back through the cable tensioning assembly 10 through (2006*a*) the back cable insertion hole 66 and through (2006*b*) the back cable exit hole 64, appropriate (application specific) tension is applied to the assembly by pulling on a loose end of the elongate member 14. Once the desired tension is applied, the connector 30 is activated by twisting/screwing, in the case of a screw, to tighten the connector 30.

In the "connecting" mode of operation 2008, a first elongate member is inserted (2002), (2004) through the case 12 of the assembly 10 on a first side, for example side 16, and the second elongate member is inserted (2008*a*), (2008*b*) through the case 12 of the assembly 10 on a second side, for example side 18, in a direction opposite the first elongate member through the back cable insertion hole 68 and the back cable exit hole 64 such that the two separate elongate members are now functionally connected together end to end by way of the cable tensioning assembly 10. Once the desired (application specific) tension is applied, the connector 30 is activated (2010) by twisting/screwing, in the case of a screw, to tighten the connector 30 and lock the two elongate members together in a functionally end to end arrangement. As described below with respect to FIGS. 18-19B the engagement can be achieved, in some embodiments of the invention, by connecting/interlocking two pieces of the connector 30 together, instead of by twisting/screwing.

In use with respect to both modes of use described above, when first vibration clamp 34 is engaged such as by tightening connector 30, the second vibration clamp 38 is pulled into place by the screwing action. Such feature locks the elongate member or each elongate member 14 (if more than one) to the case or housing 12. Thus, additional resistance is afforded and the cable tensioning assembly 10 becomes a zero-way cable pull (i.e., no motion in either direction of the gripping arrangements 24, 26, and the assembly 10. In the event of a stress, such as wind, vibration, earthquake or other weather event, acts on elongate member 14, the cable tensioning assembly 10 will move in sync with the elongate member 14 since they are now clamped together. Moreover, this feature prevents the cable tensioning assembly 10 from becoming loose, which could add slack to elongate member 14, or tighten elongate member 14 with a ratchet-like effect.

In the event tension adjustment (2012) is desired or required, or other adjustments are necessary, the connector 30 can be loosened, and the elongate member 14 released by engaging the grip release function. If greater tension is desired in the assembly, loosen the connector 30 and apply force to create tension in the assembly. Re-tighten the set screw.

To release tension (2014), a pin, screwdriver or other thin implement is inserted into a grip release 70, 72, far enough to contact a roller 58, 60 and pull the cable tensioning assembly 10 toward the release pin. With the grip released, the elongate member 14 can then be backed out of the cable tensioning assembly 10.

Figure 18:
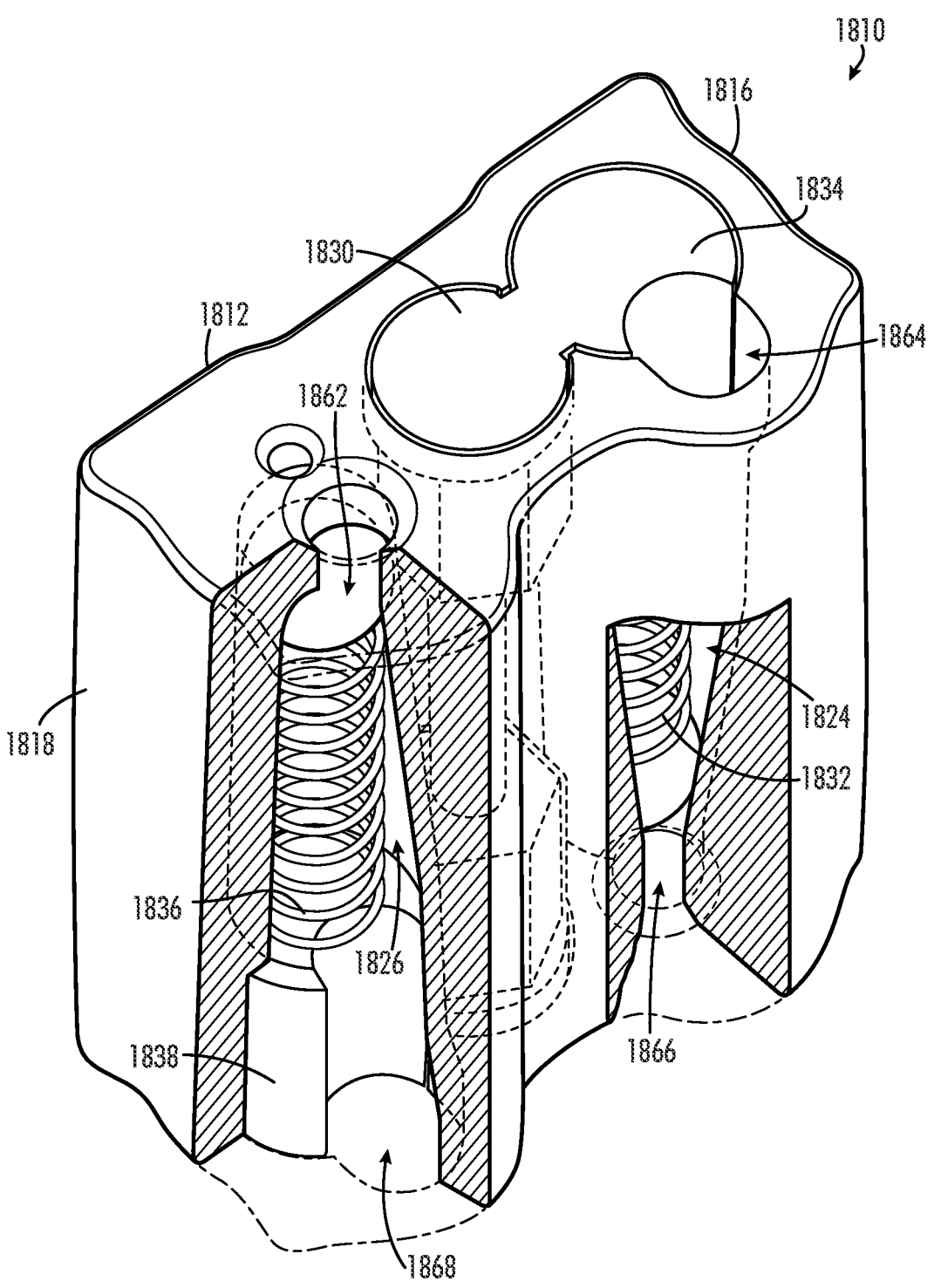
FIG. 18 is a perspective view of another example of a cable tensioning assembly.

FIG. 18 is a perspective view of a cable tensioning assembly 1810 which uses a spring cap assembly 1830 without needing a screw and clamps, such as shown in the embodiment of FIG. 1. In some embodiments of the invention, one notable difference between the cable tensioning assembly 1810 and the cable tensioning assembly 10 is the use of a "connector" or spring cap assembly 1830 that does not utilize a screw and clamps, as will be described in more detail below and particularly with respect to FIGS. 19A-19B.

In an embodiment of the invention, the spring cap assembly 1830 uses of traditional one-way clamping instead of a zero-way clamp on each side (like cable tensioning assembly 10). An additional exemplary feature of the cable tensioning assembly 1810, lies in the way the spring cap assembly 1830 is held in the case 1812 of the assembly 1830. Conventionally, cable tensioning assemblies use a notch, hole or relief in the case that allows the spring cap to clip into the case and be mechanically restrained. However, in the configuration depicted in FIGS. 18-19B, the spring caps 1830*a*, 1830*b* (of the spring cap assembly 1830) are not connected to case 1812, they hold each other inside the case as will be described in further detail with respect to FIGS. 19A and 19B, without needing connection to the case. The configuration of spring cap assembly 1830 has an advantage in manufacturing because an axially made part with no side pulls can be used, which is also relatively cheap to make. Such a spring cap 1830 could be used in situations where vibration arrest is not needed, as an example.

Figure 19A:
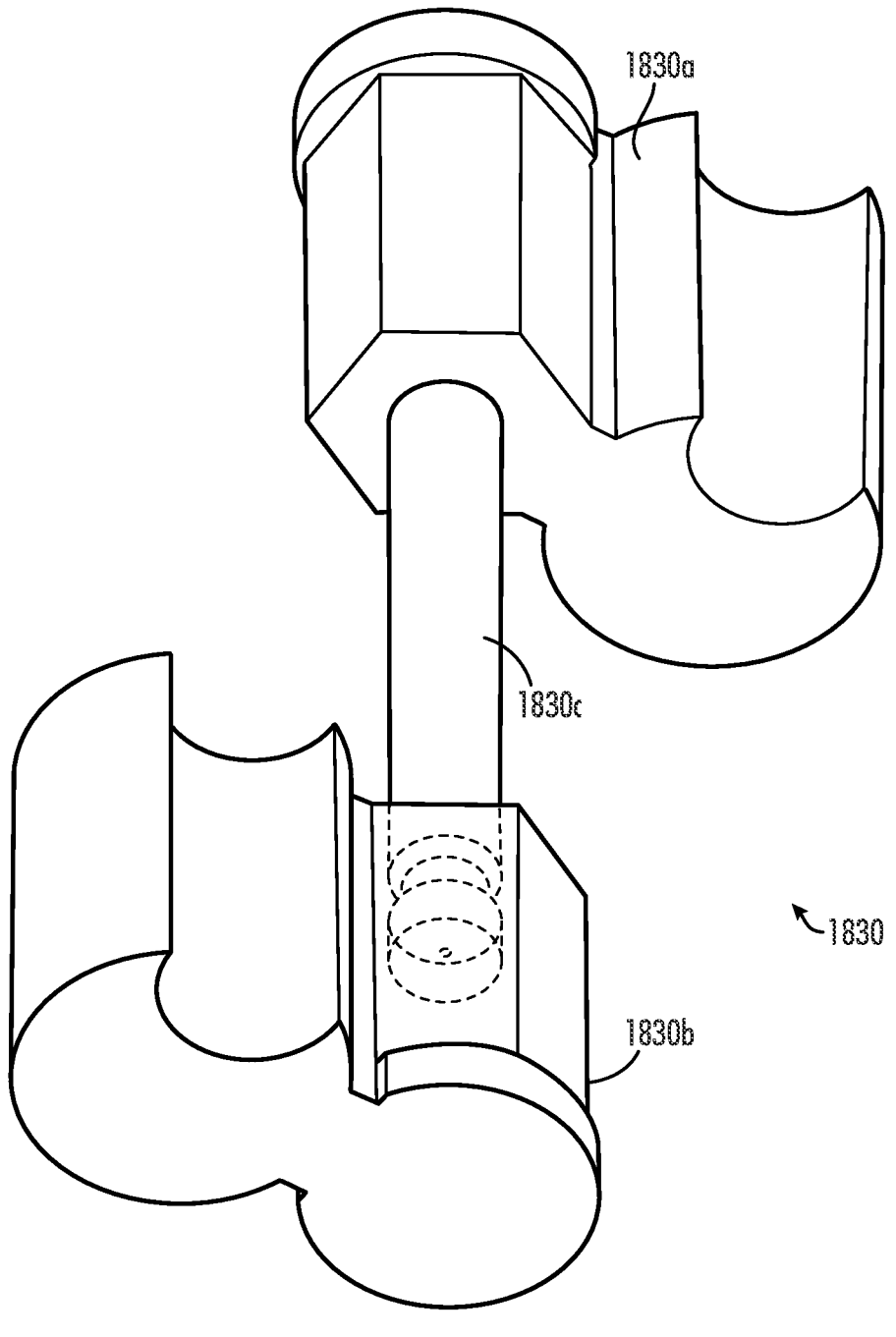
FIGS. 19A and 19B are perspective views of a spring cap assembly of the cable tensioning assembly of FIG. 18.
Figure 19B:
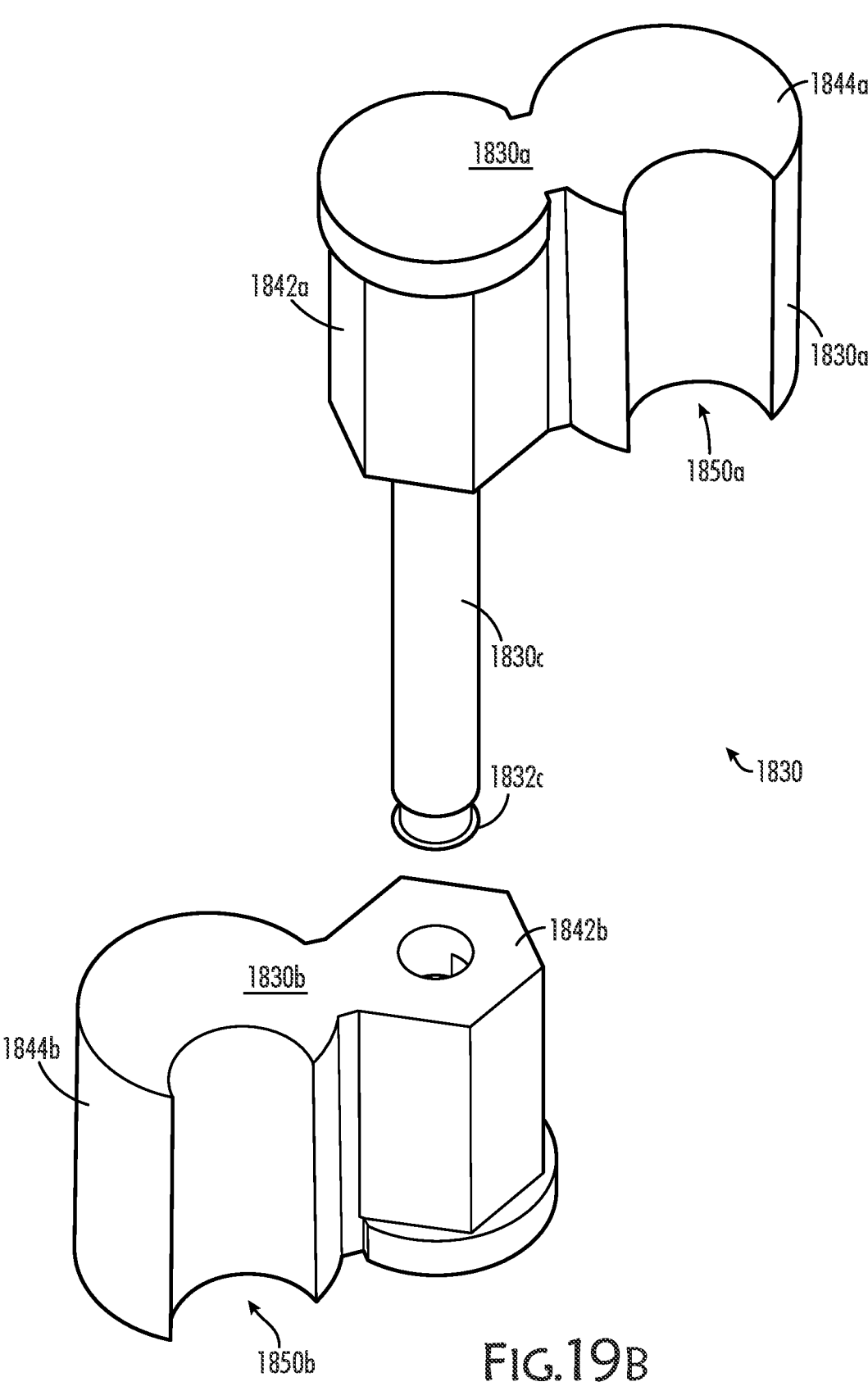

FIGS. 19A and 19B are opposite perspective views (from the bottom and from the top, respectively) of the spring cap assembly 1830 of the cable tensioning assembly 1810. In an embodiment of the invention, the spring cap assembly is comprised of two main components, a top spring cap element 1830*a* and a bottom spring cap element 1830*b*. It should be noted that while these are referred to as "top" and "bottom", they could be interchangeable within the case and this terminology is simply to ease reference to these components. In some embodiments of the invention, the spring cap elements 1830*a*, 1830*b* are provided with a taper, similar to the clamping members 34, 38.

As shown in more detail in FIG. 19B, top spring cap element 1830*a* and bottom spring cap element 1830*b* are attached to each other by a post 1830*c* which is integrated (i.e. is of unitary construction) with the top spring cap element 1830*a*, in some embodiments of the invention. Alternatively, the post 1830*c* is separate from either of the spring cap elements 1830*a*, 1830*b* and is snapped into each, just as the post 1830*c* is shown in FIG. 19B being snappable into the bottom cap element 1830*b* by using a snapping element 1832*c* (such as a ridge, which snaps into a counterpart in the bottom cap element 1830b). In an embodiment of the invention, each cap element 1830a, 1830b includes an angled portion 1842(a, b) and a curved portion 1844(a, b), not unlike the clamps 34 described above. The curved portions 1844a, 1844b include a concavity 1850a, 1850b to accommodate an elongate member 14 therethrough. In some embodiments, the one or more concavity 1850a, 1850b is straight. In some embodiments, the one or more concavity 1850a, 1850b is tapered. Optionally, spring cap assembly 1830 is friction fit into the case 1812. Optionally, the spring cap elements 1830a, 1830b are friction fit to each other.

Figure 21:
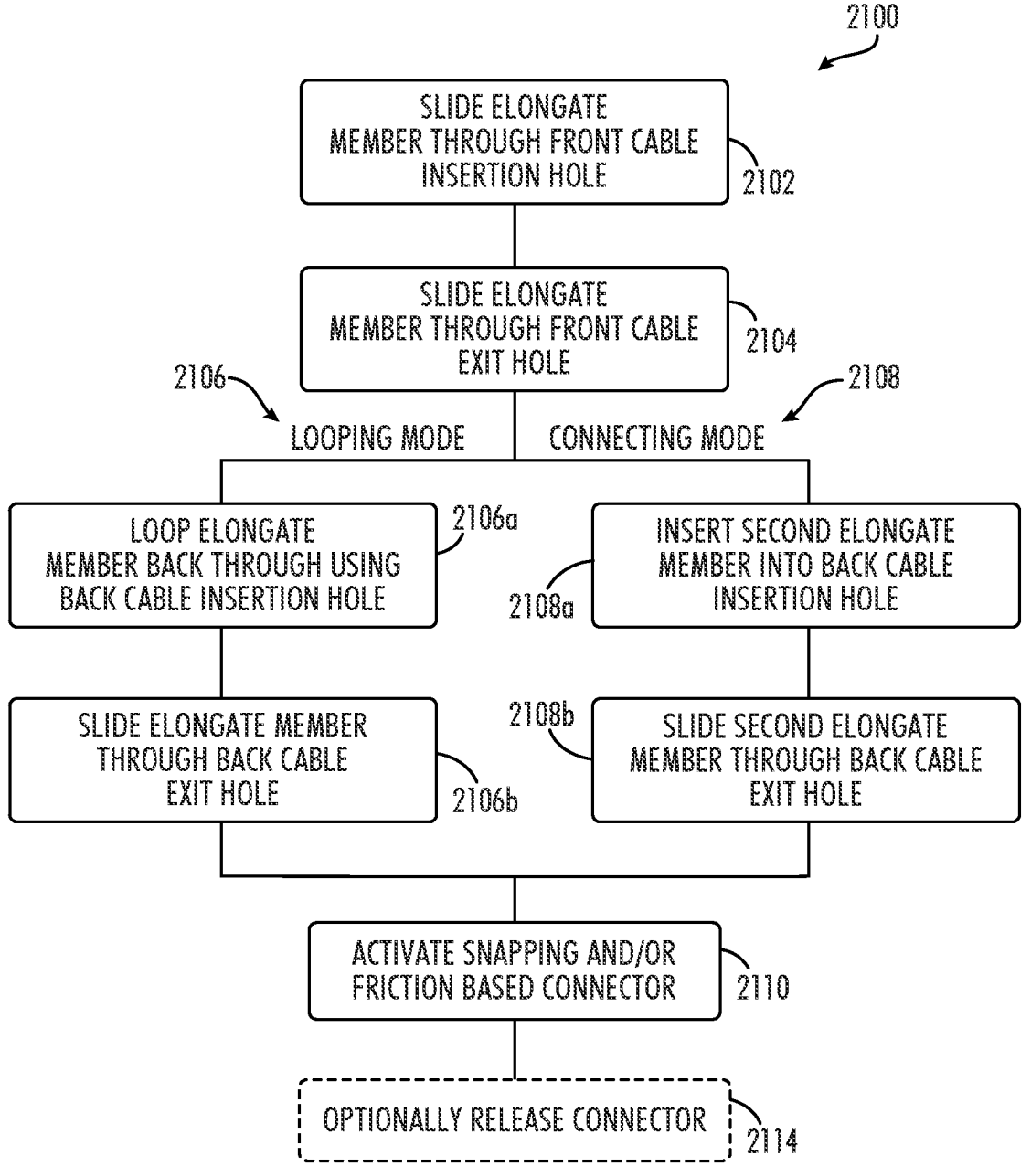

FIG. 21 is a flowchart 2100 of a method of using a cable tensioning assembly 1810 of FIGS. 18-19B. As with the cable tensioning assembly 10 described above, an elongate member can be looped through cable tensioning assembly 1810 or two elongate members can be functionally connected end to end using cable tensioning assembly 1810.

In an embodiment of the invention, an elongate member 14 is slid (2102) through the front cable insertion hole 1862 and slid (2104) through the front cable exit hole 1868 and, in the "looping" embodiment 2106, back through the cable tensioning assembly 1810 through (2106a) the back cable insertion hole 1866 and through (2106b) the back cable exit hole 1864. Appropriate (application specific) tension is applied to the assembly by pulling on a loose end of the elongate member 14. Once the desired tension is applied, the connector 1830 is activated by snapping the spring cap elements 1830a, 1830b together using the snapping element 1832c.

In the "connecting" mode of operation 2108, a first elongate member is inserted (2102), (2104) through the case 1812 of the assembly 1810 on a first side, for example side 1816, and the second elongate member is inserted (2108a), (2108b) through the case 1812 of the assembly 1810 on a second side, for example side 1818, in a direction opposite the first elongate member through the back cable insertion hole 1868 and the back cable exit hole 1864 such that the two separate elongate members are now functionally connected together end to end by way of the cable tensioning assembly 1810. Once the desired (application specific) tension is applied, the connector 1830 is activated (2110) by the connector 1830 is activated by snapping the spring cap elements 1830a, 1830b together using the snapping element 1832c, tightening the spring cap elements 1830a, 1830b wherein they hold each other within the case 1812 without needing any connection to the case 1812, while also locking the elongate members to the case. Optionally, the spring cap elements 1830a, 1830b fit together and/or within the central cavity 1828 using a friction fit.

In some embodiments of the invention, the connector 1830 is releasable (2114) after having been activated (2110).

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments±100%, in some embodiments±50%, in some embodiments±20%, in some embodiments±10%, in some embodiments±5%, in some embodiments±1%, in some embodiments±0.5%, and in some embodiments±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the subject matter herein.

What is claimed is:

1. A cable tensioning assembly for securing at least one cable, comprising:
   a case having a first side and an opposing second side with a first and a second curved cavity, respectively;
   a first and second gripping arrangement in the first and the second curved cavity, respectively, each of the gripping arrangements having a clamp; and,
   a central cavity with a connector disposed within said central cavity, wherein each of the gripping arrangement clamps are adapted to secure the at least one cable against the case by activating the connector.

2. The cable tensioning assembly of claim 1, where the first side and the second side are symmetrical.

3. The cable tensioning assembly of claim 1, wherein the first and second gripping arrangements are positioned in opposing directions within the first and second curved cavities.

4. The cable tensioning assembly of claim 1, wherein each of the gripping arrangements includes a body with an angled end and a curved end.

5. The cable tensioning assembly of claim 4, wherein the angled end is hexagonal.

6. The cable tensioning assembly of claim 5, wherein the angled end has a central opening.

7. The cable tensioning assembly of claim 4, wherein the curved end has a central recess.

8. The cable tensioning assembly of claim 1, wherein the gripping arrangements are vertically aligned within the first and second cavities, respectively.

9. The cable tensioning assembly of claim 8, wherein each of the gripping arrangements includes an urging member.

10. The cable tensioning assembly of claim 1, wherein the gripping arrangements are integrated by the connector.

11. The cable tensioning assembly of claim 1, wherein at least one of the clamps includes an angled end and a curved end.

12. The cable tensioning assembly of claim 11, wherein the angled end is hexagonal.

13. The cable tensioning assembly of claim 11, wherein the curved end includes a recess.

14. The cable tensioning assembly of claim 11, wherein the curved end includes a concave portion along the edge of the curved end.

15. The cable tensioning assembly of claim 14, wherein the clamp with the curved end has a top side and a bottom side, and where the concave portion is tapered between the top and bottom sides.

* * * * *